United States Patent
Bopardikar et al.

(10) Patent No.: US 6,404,975 B1
(45) Date of Patent: Jun. 11, 2002

(54) VIDEO STORAGE

(75) Inventors: Raju C. Bopardikar, Cambridge, MA (US); Adrian R. Braine, Newbury (GB)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 08/843,282

(22) Filed: Apr. 14, 1997

Related U.S. Application Data

(60) Provisional application No. 60/015,468, filed on Apr. 15, 1996.

(30) Foreign Application Priority Data

Sep. 12, 1996 (GB) .............................................. 9619120

(51) Int. Cl.[7] .............................................. H04N 5/91
(52) U.S. Cl. .............................. 386/46; 386/125; 714/6; 714/7
(58) Field of Search .......................... 386/4, 21, 45–46, 386/52, 64, 113, 116, 125–126; 360/13, 15–17; 369/83–85; 348/7, 1–6, 8–14; 714/6–7; H04N 5/91

(56) References Cited

U.S. PATENT DOCUMENTS

| | | |
|---|---|---|
| 4,056,843 A | 11/1977 | Bishop et al. |
| 4,500,908 A | 2/1985 | Mandeberg |
| 4,530,048 A | 7/1985 | Proper |
| 4,577,240 A | 3/1986 | Hedberg et al. |
| 4,855,813 A | 8/1989 | Russell et al. |

(List continued on next page.)

FOREIGN PATENT DOCUMENTS

| | | |
|---|---|---|
| EP | 0 519 670 A1 | 6/1992 |
| EP | 0 501 818 | 9/1992 |
| EP | 0 605 170 | 7/1994 |
| EP | 0 663 638 | 7/1995 |
| GB | 2 273 584 A | 6/1994 |
| GB | 2278228 | 11/1994 |
| GB | 2297855 | 4/1996 |
| WO | WO 98/10586 | 3/1998 |

OTHER PUBLICATIONS

Willner, "Transforming the PC Into a TV, Radio, VCR, and Video Editing Studio", WESCOM '95 Conference Record Microelectronics, Communications Technology, Producing Quality Products, Mobile and Portable Power, Emerging Technologies, San Francisco, No. 7–9, 1995, Nov. 7, 1995, Institute of Electrical and Electronics Engineers, pp. 743–748.

Fronczak et al., "Motion JPEG and MPEG Solutions for Multimedia", WESCON '95 Conference Record Microelectronics, Communications Technology, Producing Quality Products, Mobile and Portable Power, Emerging Technologies, San Francisco, No. 7–9, 1995, Nov. 7, 1995, Institute of Electrical and Electronics Engineers, pp. 738–742.

*Primary Examiner*—Vincent F. Boccio
(74) *Attorney, Agent, or Firm*—Gates & Cooper LLP

(57) ABSTRACT

Video data in the form of a plurality of digitised frames, is stored on a plurality of magnetic disks. Each image frame is striped across a plurality of disks and redundant parity information, derived from the stripes, is written to an additional disk. Disk failure is detected and in response to this detection missing data is regenerated from the parity information. This allows the transfer of video data in real time to be maintained for output so that the system remains operational. While data is being read in real time, derived-from regenerated data, the regenerated data is written to an operational disk, thereby reprotecting the data in the event of a subsequent failure. Frame supplied to output are labelled as being protected or unprotected and application programs may respond to this status information as considered appropriate.

31 Claims, 27 Drawing Sheets

U.S. PATENT DOCUMENTS

| | | |
|---|---|---|
| 5,027,212 A | 6/1991 | Marlton et al. |
| 5,157,511 A | 10/1992 | Kawai et al. |
| 5,208,813 A * | 5/1993 | Stallmo .................. 714/7 |
| 5,247,347 A | 9/1993 | Litteral et al. |
| 5,265,098 A * | 11/1993 | Mattson et al. ............ 371/11.1 |
| 5,278,838 A * | 1/1994 | Ng et al. ...................... 714/6 |
| 5,309,560 A | 5/1994 | Abe et al. |
| 5,369,532 A * | 11/1994 | Dodt et al. .................... 360/48 |
| 5,452,235 A | 9/1995 | Isani |
| 5,455,628 A | 10/1995 | Bishop |
| 5,469,308 A | 11/1995 | Hamoda et al. |
| 5,488,695 A | 1/1996 | Cutter |
| 5,499,341 A * | 3/1996 | Wilson et al. ......... 395/200.03 |
| 5,510,905 A | 4/1996 | Birk |
| 5,517,612 A | 5/1996 | Dwin et al. |
| 5,530,557 A | 6/1996 | Asit et al. |
| 5,530,850 A * | 6/1996 | Ford et al. .................. 395/600 |
| 5,559,764 A | 9/1996 | Chen et al. |
| 5,568,180 A | 10/1996 | Okamoto |
| 5,583,653 A | 12/1996 | Timmermans |
| 5,590,381 A * | 12/1996 | Mourad .................... 395/872 |
| 5,598,276 A | 1/1997 | Cookson et al. |
| 5,611,056 A | 3/1997 | Hotchkin |
| 5,623,595 A * | 4/1997 | Bailey .......................... 714/6 |
| 5,671,386 A | 9/1997 | Blair et al. |
| 5,671,389 A | 9/1997 | Saliba |
| 5,678,023 A | 10/1997 | Adams et al. |
| 5,696,905 A | 12/1997 | Reimer et al. |
| 5,719,983 A | 2/1998 | Henderson et al. |
| 5,719,985 A | 2/1998 | Ito et al. |
| 5,720,037 A | 2/1998 | Bilris et al. |
| 5,751,336 A | 5/1998 | Aggarwal et al. |
| 5,754,730 A | 5/1998 | Windrem et al. |
| 5,758,057 A * | 5/1998 | Baba et al. ............ 395/182.05 |
| 5,768,623 A * | 6/1998 | Judd et al. .................. 395/857 |
| 5,771,354 A | 6/1998 | Crawford |
| 5,818,439 A | 10/1998 | Nagasaka et al. |
| 5,852,715 A | 12/1998 | Raz et al. |
| 5,884,028 A | 3/1999 | Kindell et al. |
| 5,884,098 A | 3/1999 | Mason, Jr. |
| 5,890,203 A | 3/1999 | Aoki |
| 5,893,919 A | 4/1999 | Sarkozy et al. |
| 5,968,158 A | 10/1999 | Andrews et al. |
| 6,055,354 A | 4/2000 | Bopardikar |

* cited by examiner

Figure·19

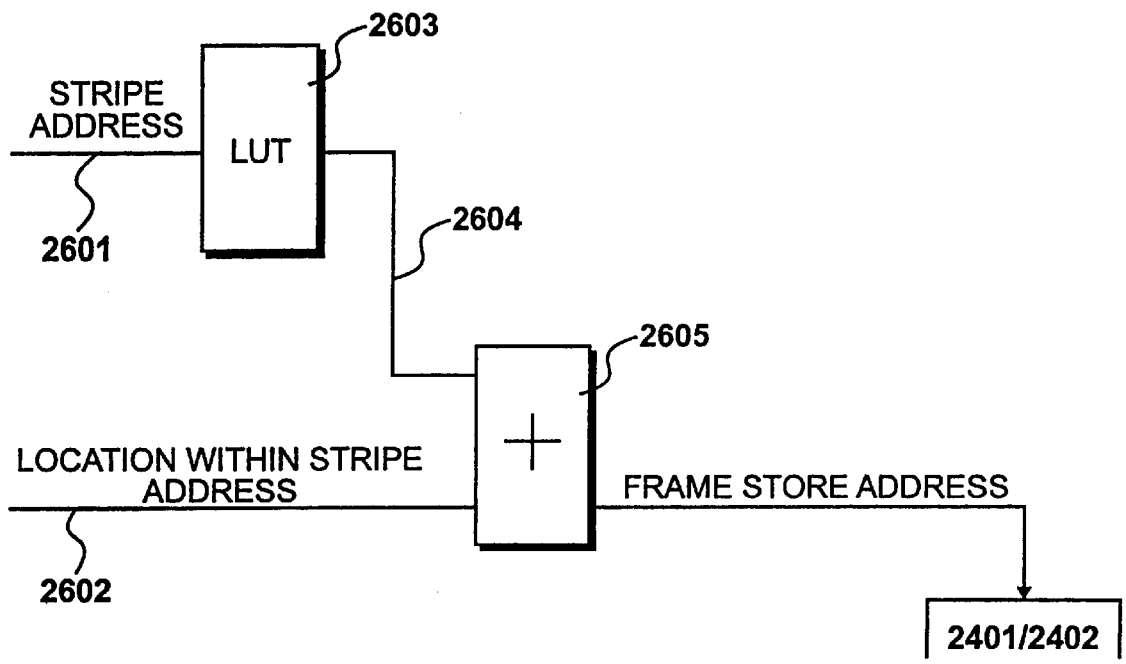
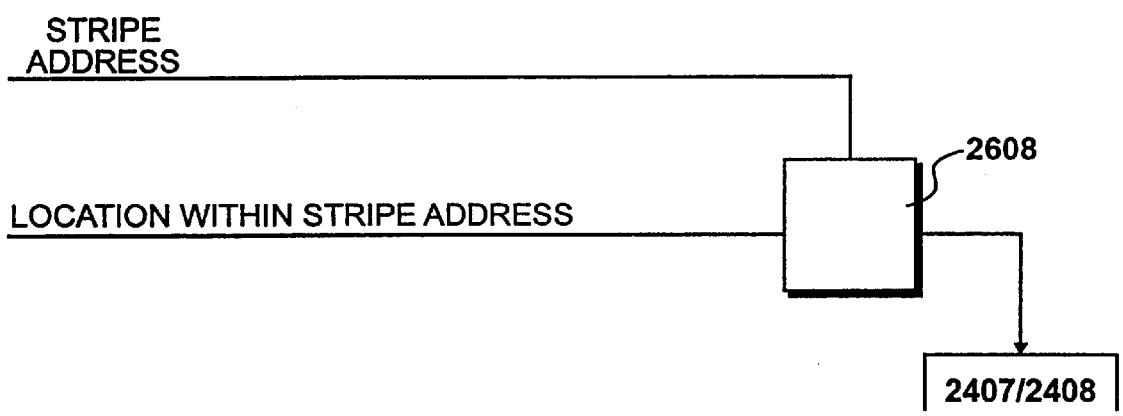
Figure 26

VIDEO STORAGE

The present invention is a continuation in part of U.S. patent application Ser. No. 60/015,468 filed on Apr. 15, 1996.

The present invention relates to the storage of video data, in which video frames are stored on a plurality of storage devices.

INTRODUCTION

Systems are known for storing data in which data transfer rates are increased by dividing the data source into a plurality of sub-streams and thereafter writing said sub-streams in parallel. Conventional and relatively inexpensive computer disks are now capable of storing large amounts of data, typically providing for many gigabits of data to be stored on each disk. Two problems exist with these disks, however, in that the maximum data transfer rate is limited and the disks are susceptible to occasional failures, resulting in total data loss.

Data transfer rates may be increased by arranging the disks as an array, such that a data source is divided into a plurality of streams with said streams being written in parallel to a plurality of disks. Thus, for example, a video image may be divided into a plurality of regions scanning nature of most video images usually referred to as stripes. Thus, a video frame may be divided into a plurality of stripes, with each of said stripes being written to its own respective disk.

As the number of disks in an array increases, the likelihood of one of these disks failing increases. If the data on such a disk is lost, the whole frame will become unusable, therefore such an arrangement would not be acceptable in most applications. To overcome this problem, it is known to provide an additional disk configured to store redundant parity data. Upon disk failure, the lost data may be reconstituted from the parity information by XORing the parity information with the remaining streams. However, when operating in this mode, the array is effectively unprotected and further failure will result in catastrophic loss. Consequently, in existing systems, the array would be taken off-line, a new disk would be introduced to the array and the lost data would be reconstituted from the parity data and thereafter written to the replacement disk; a process commonly referred to "healing".

The problem with this approach is that the off-line healing procedure may take a considerable amount of time which effectively places expensive equipment off-line.

SUMMARY OF THE INVENTION

According to a first aspect of the present invention, there is provided video storage apparatus including storage means, transfer means and processing means, wherein said storage means comprises a plurality of storage of devices configured to store respective stripes of image frames with redundant data derived from said stripes, said transferring means is arranged to transfer image data at substantially image display rate or at a rate greater than said display rate, and said processing means is configured to regenerate lost data from said redundant data during a reading operation and said processing means is configured to write said regenerated data to an operational storage device.

In a preferred embodiment, the storage devices are magnetic disks and each stripe may be written to a respective disk with redundant data being written to a separate disk. The redundant data may be parity data derived by an exclusive ORing operation.

In a preferred embodiment, output data is written to a frame buffer and two output frame buffers may be provided which alternate in operation, to effect double buffering in which a first buffer is written to randomly from the storage devices and a second buffer is read sequentially as a synchronized video stream. The video stream may be compatible with D1 video recommendations.

According to a second aspect of the present invention, there is provided a method of storing video data, wherein image stripes derived from image frames in combination with redundant data derived from said stripes are stored on a plurality of storage devices, image data is transferred at substantially image display rate or at a rate greater than said display rate, lost data is regenerated from said redundant data during a reading operation, and said regenerated data is written to an operational storage device while output data is being supplied at said transfer rate.

In a preferred embodiment, errors are detected during the replay of video data and data regeneration is initiated in response to said detection.

The video data may be derived from cinematographic film, high definition video frames, or broadcast quality video fields.

BRIEF DESCRIPTION OF THE DRAWINGS

FIG. 26 details the random addressing circuits shown in FIG. 24; and

DETAILED DESCRIPTION OF THE PREFERRED EMBODIMENTS

The invention will now be described by way of example only with reference to the previously identified drawings.

Figure 1:
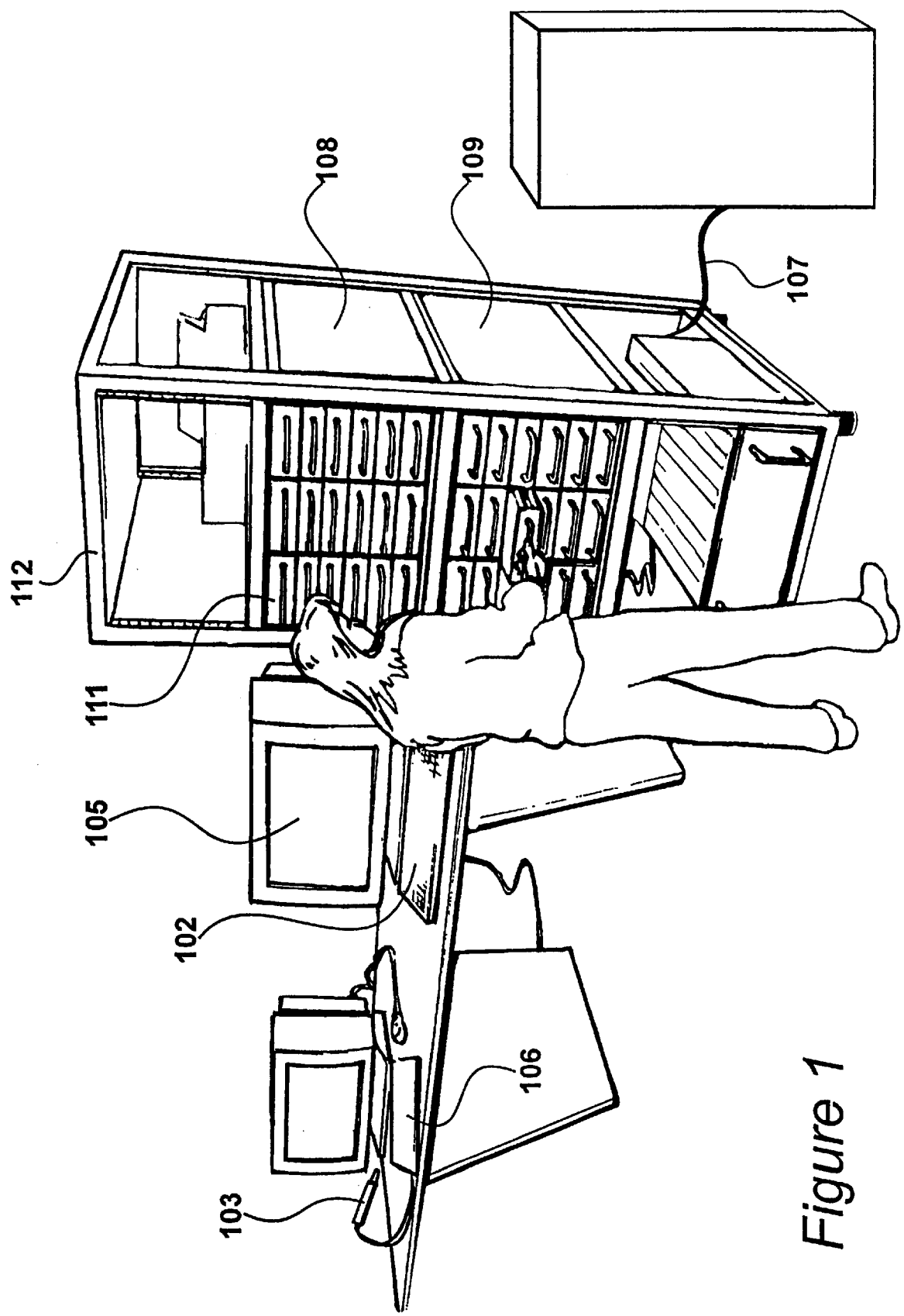
FIG. 1 shows an image data processing environment of a first embodiment, including a graphics processor and an array of disk drives.

An image data processing environment is shown in FIG. 1, in which an image processing device 101 receives input commands from manually operable devices, including a keyboard 102 and a stylus 103. In the preferred embodiment, the image processing device 101 is an SGI Onyx, manufactured by Silicon Graphics Incorporated. A video image is displayed on a monitor 105 and modifications, special effects and edits are defined in response to manual operation of said stylus 103 upon a touch tablet 106. The environment may be similar to those marketed by the present Assignee under the trademarks "INFERNO", "FLAME" and "FLINT".

The image processing device 101 includes internal storage, allowing a plurality of image frames to be retained locally for subsequent manipulation and editing. In addition, the image processing device includes a connection 107 arranged to supply image frames at video rate (or higher), thereby substantially increasing the extent to which video manipulations may be effected within the environment, without requiring local data transfers. Connection 107 consists of a plurality of Fast and Wide Differential SCSI cables connected to two arrays of disk drives 108 and 109. Individual disk modules 111 are housed within a rack 112. It is accepted that, over time, problems will occur with specific disk drive modules 111, either in terms of part of the disk becoming damaged or the entire disk module 111 becoming totally inoperable, a condition often referred to as a "head crash". The disks are therefore configured as a redundant array of inexpensive disks (RAID) such that parity data is generated when data is written to the array, allowing any individual disk to be replaced if a head crash occurs without any data actually being 10 lost.

As shown in FIG. 1, a damaged disk is removed from the array for replacement with a similar unit. Procedures are then invoked to read parity data, in combination with all of the remaining image data, so as to reconstitute the lost data and to reestablish the data in the array as being protected against similar future drive malfunction.

Figure 2:
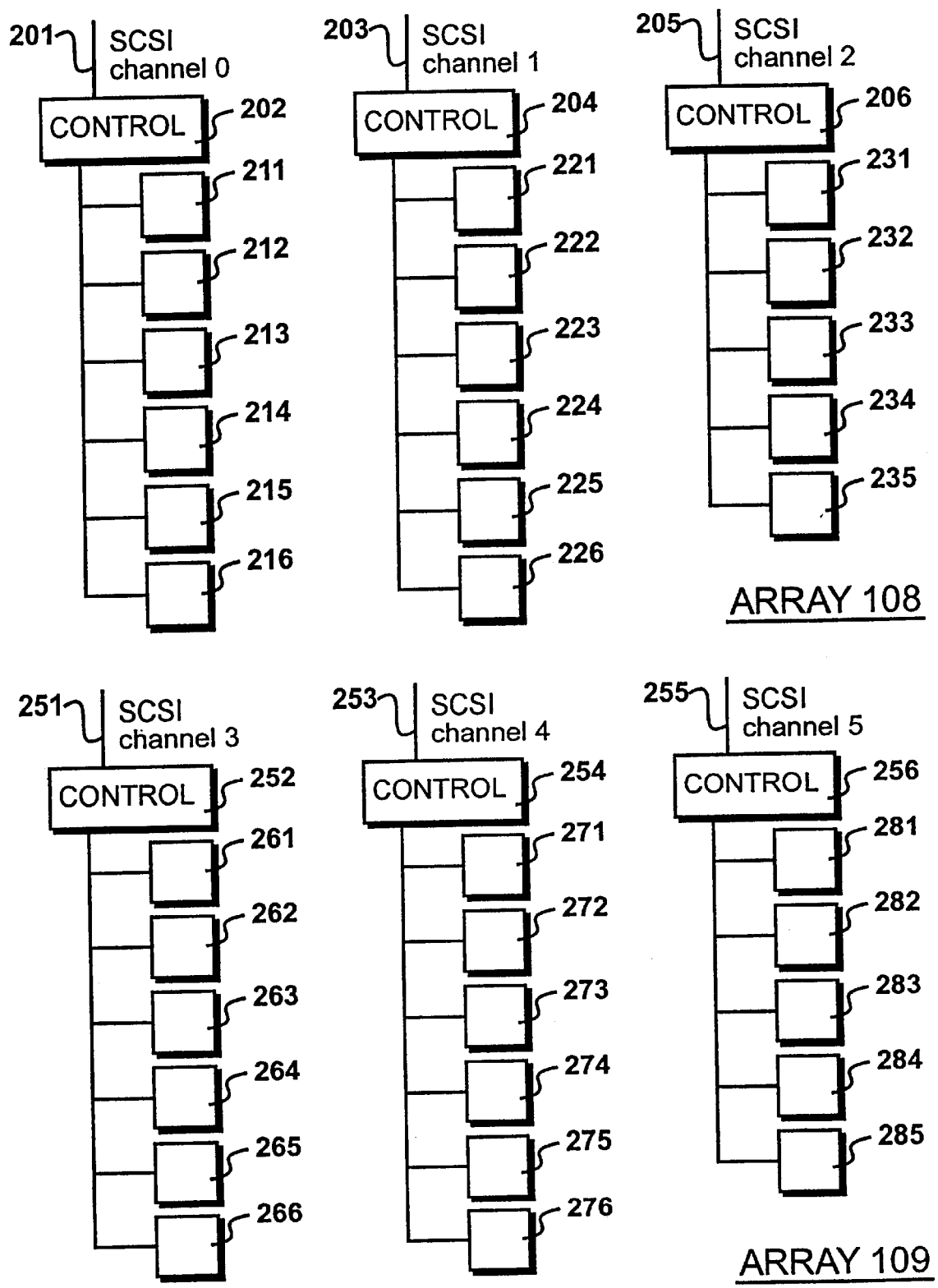
FIG. 2 details the arrangement of the array of disk drives shown in FIG. 1, including individual disk drives.

Configuration of the disk drive arrays 108 and 109 shown in FIG. 1 is detailed in FIG. 2. Array 108 is connected to three SCSI channels. SCSI channel 0, 201, is connected to control circuitry 202. SCSI channel 1, 203, is connected to control circuitry 204. SCSI channel 2, 205, is connected to control circuitry 206. Control circuitry 202 supplies and receives SCSI control and data signals to and from an array of six high capacity hard disk drives, 211, 212, 213, 214, 215 and 216, each having a capacity of two gigabits of data. The control circuitry 202 and each of the six drives connected to control circuitry 202 is considered as being a SCSI target. The control circuitry is considered as being target zero, drive 211 is target one, drive 212 is target two, drive 213 is target three, drive 214 is target four, drive 215 is target five and drive 216 is target six.

Similarly, SCSI channel 2, 203, communicates with control circuitry 204 and drives 221, 222, 223, 224, 225 and 226, considering these as targets zero to six respectively. SCSI channel 2, 205, similarly communicates with control circuitry 206 and drives 231, 232, 233, 234 and 235.

The array 108 may be considered as comprising a main disk array in which there are three columns and five rows, making a total of fifteen disks. The remaining two disk drives, 216 and 226, are used for parity information and as a spare disk respectively. The parity information may be used to reconstruct data which is lost from a drive in the array, and the spare disk 226 may be used to replace a drive which has suffered a major fault, such as a head crash.

Also shown in FIG. 2 is array 109. This comprises an identical arrangement to that which is shown for array 108, with the exception that connections are made via different SCSI connections. These are SCSI channel 3, 251, SCSI channel 4, 253 and SCSI channel 5, 255. Thus control circuitry 252 is considered as target zero on SCSI channel three, controlling drives 261, 262, 263, 264, 265 and 266, which are considered as being SCSI targets one to six respectively. Control circuitry 254 is considered as being target zero on SCSI channel 4, and drives 271, 272, 273, 274, 275 and 276 are considered as being SCSI targets one to six respectively. Control circuitry 256 is considered as target zero on SCSI channel five, with drives 281, 282, 283, 284 and 285 as SCSI targets one to five. Drive 266 is used to store parity information, and drive 276 is spare.

Figure 3:
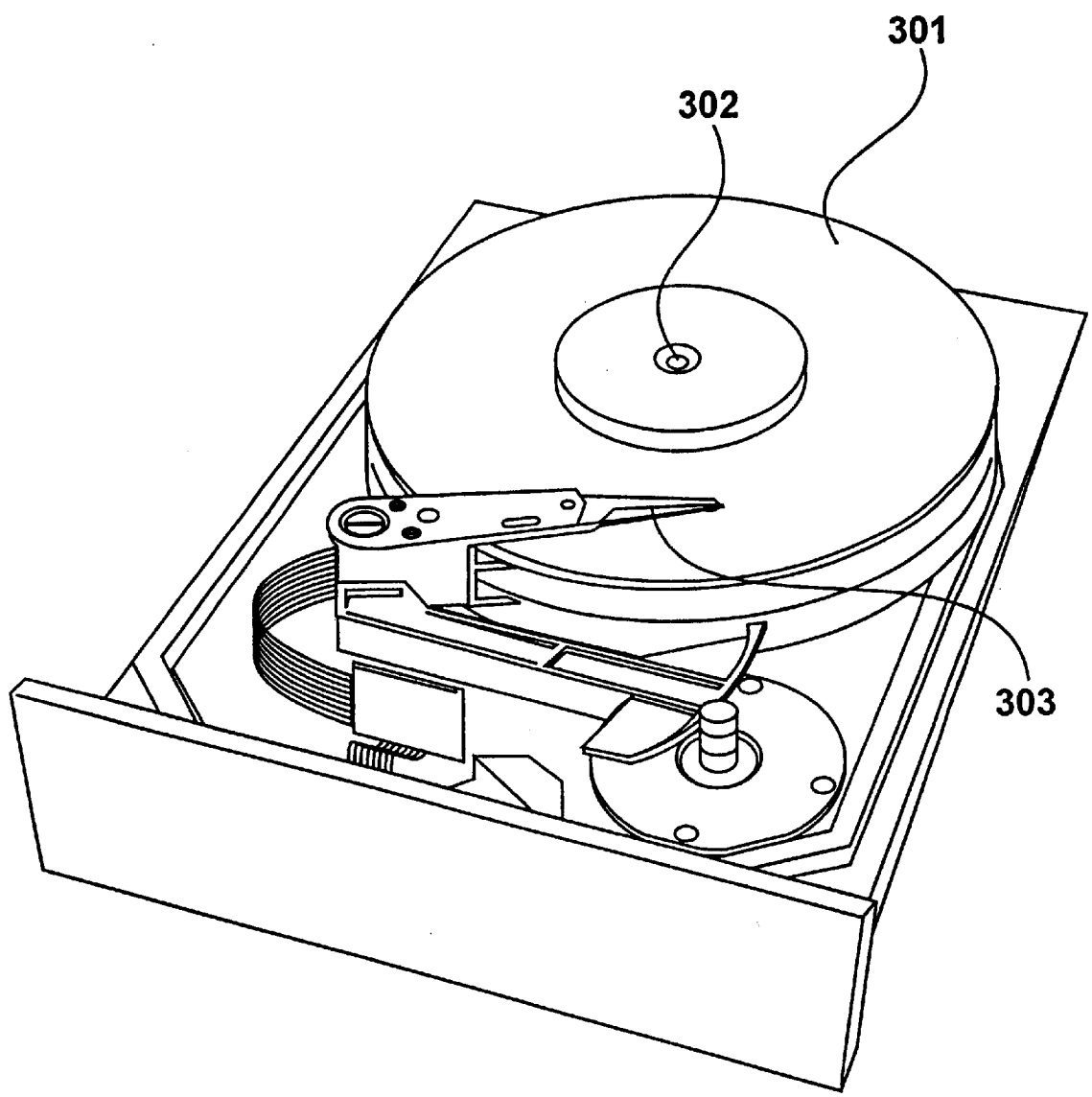
FIG. 3 details an individual disk drive of the type identified in FIG. 2.

A disk drive unit 111 of the type shown in FIG. 1, and indicated in FIG. 2 is illustrated in FIG. 3, having outer casing and seals etc. removed. The disk comprises a rotatable magnetic medium 301 arranged to rotate about a drive shaft 302. The disk is accessed by means of a head 303, arranged to be supported by a cushion of air generated by the rotating velocity of the disk 301 below it. Information on the disk 301 is formatted as a plurality of tracks and sectors and a data access is made by moving the head 303 radially across the disk to the particular circumference at which data is to be written to or read from the disk. The time taken for data to be written to the disk or read from the disk may be considered as being made up of three components. Firstly, it is necessary for the head 303 to traverse radially across the disk in order to locate itself at the appropriate sector for data transfer. Secondly, data transfer can only take place when the disk has positioned itself such that the start of the appropriate sector is directly below the transfer head. Finally, the actual data transfer takes place involving a magnetic interaction between the recording medium 301 and the head itself. If large data transfers occur, using relatively large regions of disk, the time taken for such a transfer to occur will be predominantly dependent on the third component, with the first and second components being relatively small. However, as the area of interaction on the disk becomes smaller, the duration required in terms of the first and second components becomes relatively large, such that the perceived transfer rate will be influenced not so much by the actual rate at which data may be transferred to or from the disk, but in terms of the time taken for the head to traverse across the disk and for the appropriate start of the data to reach the position of the head over the disk.

In known systems it is necessary to define the striping of discs at a stage of system configuration. System configuration is a major undertaking, and cannot be performed on a daily basis. Indeed, the complexity of system configuration is such that it is to be avoided except when it is absolutely essential, such as when a new graphics processor has been purchased and it is necessary to define the striping of disks for all anticipated uses of the disc array.

Figure 4:
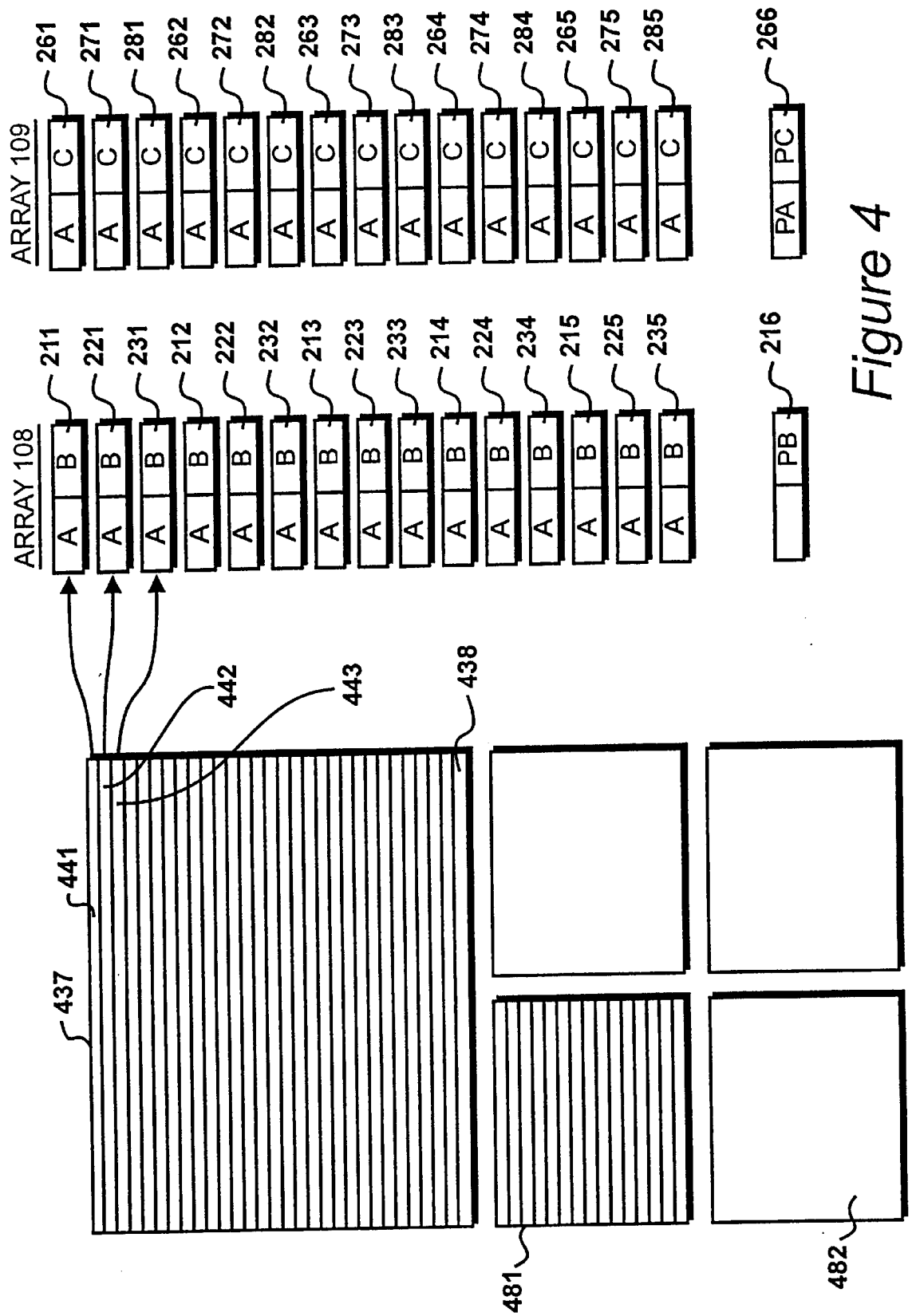
FIG. 4 illustrates frames of image data being striped over the array shown in FIG. 2.

Furthermore, in known systems, the striping of disks for use with particular data formats, such as broadcast quality video frames of NTSC and HDTV, requires that the disks are logically partitioned. Striping, and its relationship with disk partitions, is shown in FIG. 4.

A frame of high definition television (HDTV) data 437 is conceptually split into stripes, 441, 442 and 443. Each stripe is supplied to a separate disk drive 211, 221 and 231. The same stripes from preceding and successive frames are sent to these same drives. Thus, although each drive has data capacity for a number of frames, stripes are stored across several drives in order to facilitate the high speed of data transfer that is required for television signals. In the example shown in FIG. 4, HDTV signals are stored on areas of disks designated with the letter A. Thus an area A of each disk has been assigned to the storage of HDTV frames 437.

In a typical video editing studio, more than one type of television signal will be used, depending on the job in hand. Thus, it makes sense to designate an area of each disk for another type of storage, for example NTSC video frames. An NTSC video frame 481, split into stripes, is also shown in FIG. 4. In disk drive array 108, half of each disk has been assigned for storage of HDTV frames, A, and the other half has been designated for storage of NTSC frames B. This allocation is known as a partition, and is fixed at the time of system installation. Thus drive 211 is partitioned into two areas, A and B, for the exclusive use of HDTV and NTSC frame data, respectively.

HDTV frames require considerably more bandwidth for display in real time than NTSC or PAL frames. Thus, although an NTSC frame may be read at sufficient speed from an array 108 of fifteen striped disks 211 to 235 plus parity 216, HDTV frames must be striped over thirty striped disks: 211 to 235 and 261 to 285 plus parity 266, in order to attain the necessary high bandwidth. Thus two drive arrays 108 and 109 are required. The drives in the second array 109 are striped for use by a third data type, C, for example PAL television signals 482, or some other type of high bandwidth data.

Partitioning of the arrays into areas A, B and C is performed when the system is initially configured, and does not take into account the day-to-day variation in data types which will be experienced when the system is in use. Thus, on days when no HDTV editing is to be done, half of the available disk space is unavailable. Given that such an array is expensive, existing solutions provide an inefficient method of allocating disk space.

The drives in the array are permanently partitioned into a single logical area, as opposed to the several areas A, B and C of known systems. The maximum bandwidth required from the array is taken into consideration, and a fixed number of stripes is defined. For example, if the system has to cope with HDTV signals, it will be necessary to define the number of stripes as being set to thirty. Alternatively, if only NTSC, PAL and lower bandwidth signals, such as JPEG2, are to be encountered, the number of stripes may be preset to fifteen.

Figure 5:
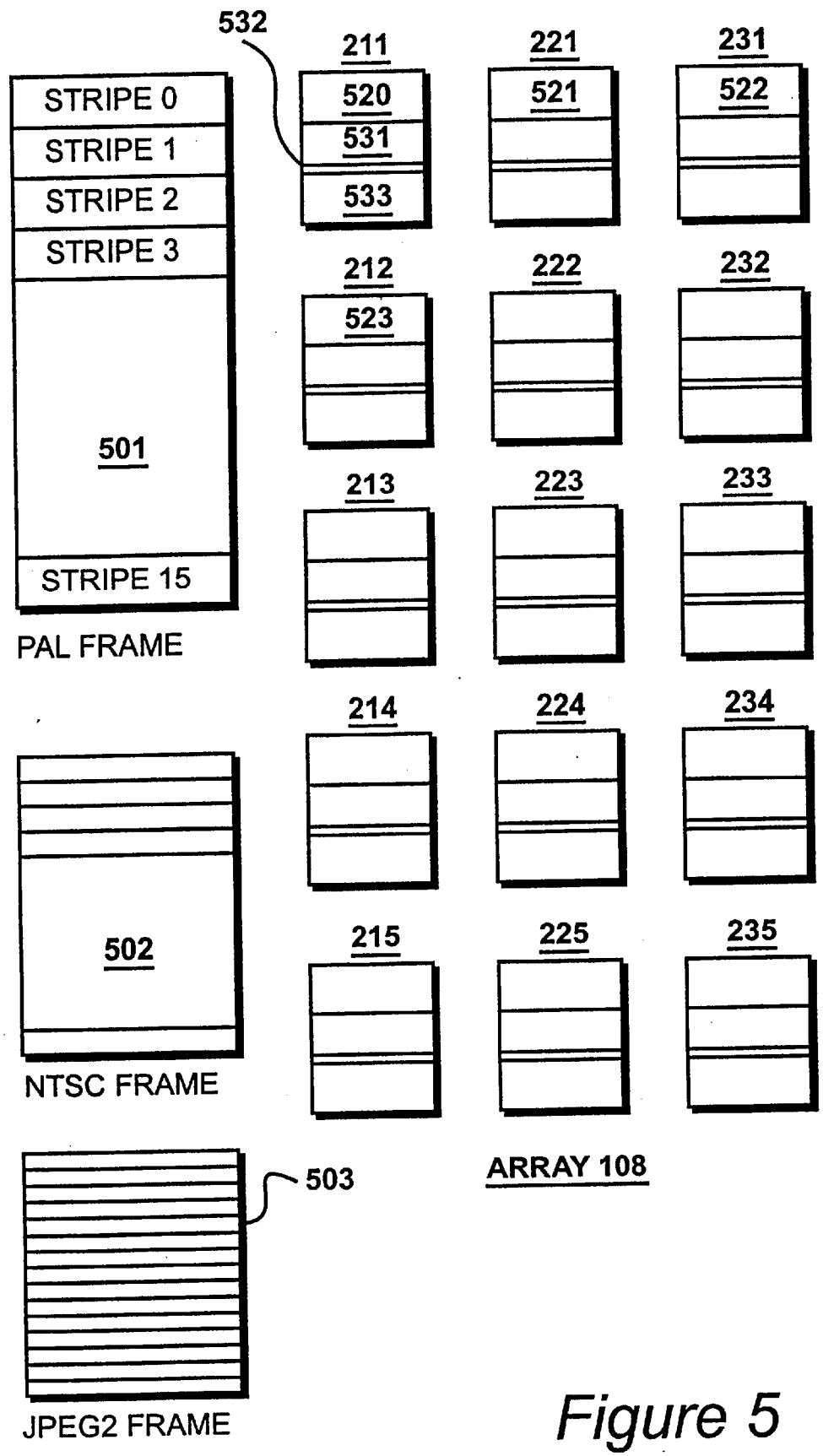
FIG. 5 shows an improved distribution of data over the disk array shown in FIG. 2.

Each frame of video data is divided up into the same number of stripes by the graphics processor 101, regardless of the amount of data in a frame. Thus the size of each stripe, or the striping interval, depends on the amount of data required for a particular frame. An example of a system using a fixed number of fifteen stripes is shown in FIG. 5. An incoming PAL frame 501 is split into fifteen equal sized stripes. Each stripe is supplied to a different drive in the array 108. Thus, stripe 0 from frame 501 is supplied to disk drive 211 and is stored in area 520. Stripe 1 from frame 501 is supplied to area 521 on disk drive 221. Stripe 2 from frame 501 is supplied to area 522 on disk drive 231, stripe 3 from frame 501 is supplied to area 523 on disk drive 212, and so on. Stripes are written substantially simultaneously to all fifteen drives in order to achieve the required high video bandwidth.

Frame 502, shown in FIG. 5, is from an NTSC image data source, requiring slightly less storage than the PAL frame 501. This is also stored as fifteen equal length stripes in the drive array 108. But in this case, each stripe 531 will be slightly shorter than each stripe 520 for the PAL signal. A JPEG2 source frame 503 requires less storage than either the PAL frame 501 or the NTSC frame 502,. This also is split into fifteen equal length stripes 532 for storage on the fifteen drives in the array 108.

Thus, as each incoming frame is supplied to the array 108, a different length stripe is selected in accordance with the amount of data in each frame. Certain video frame data will include preceding data which indicates the amount of data to follow which will make up a single frame. In this case, it is possible for the graphics processor 101 to divide up image data as it is transferred to the drive array 108 into stripes of the required size, such that fifteen stripes will be used to store the frame. Alternatively, some video sources will not have their frame data size defined before the data is received. In this case it is necessary to buffer the data for the individual frame, measure the size of the data once the frame is completely received, and then allocate a stripe size accordingly. The frame is then transferred from the buffer to the drive array as fifteen correctly sized stripes. Preferably, procedures for manipulating video images include means or procedures for measuring and identifying a frame size before a frame is supplied to a drive array, such that the striping interval may be adjusted without the need to buffer frame data.

Figure 6:
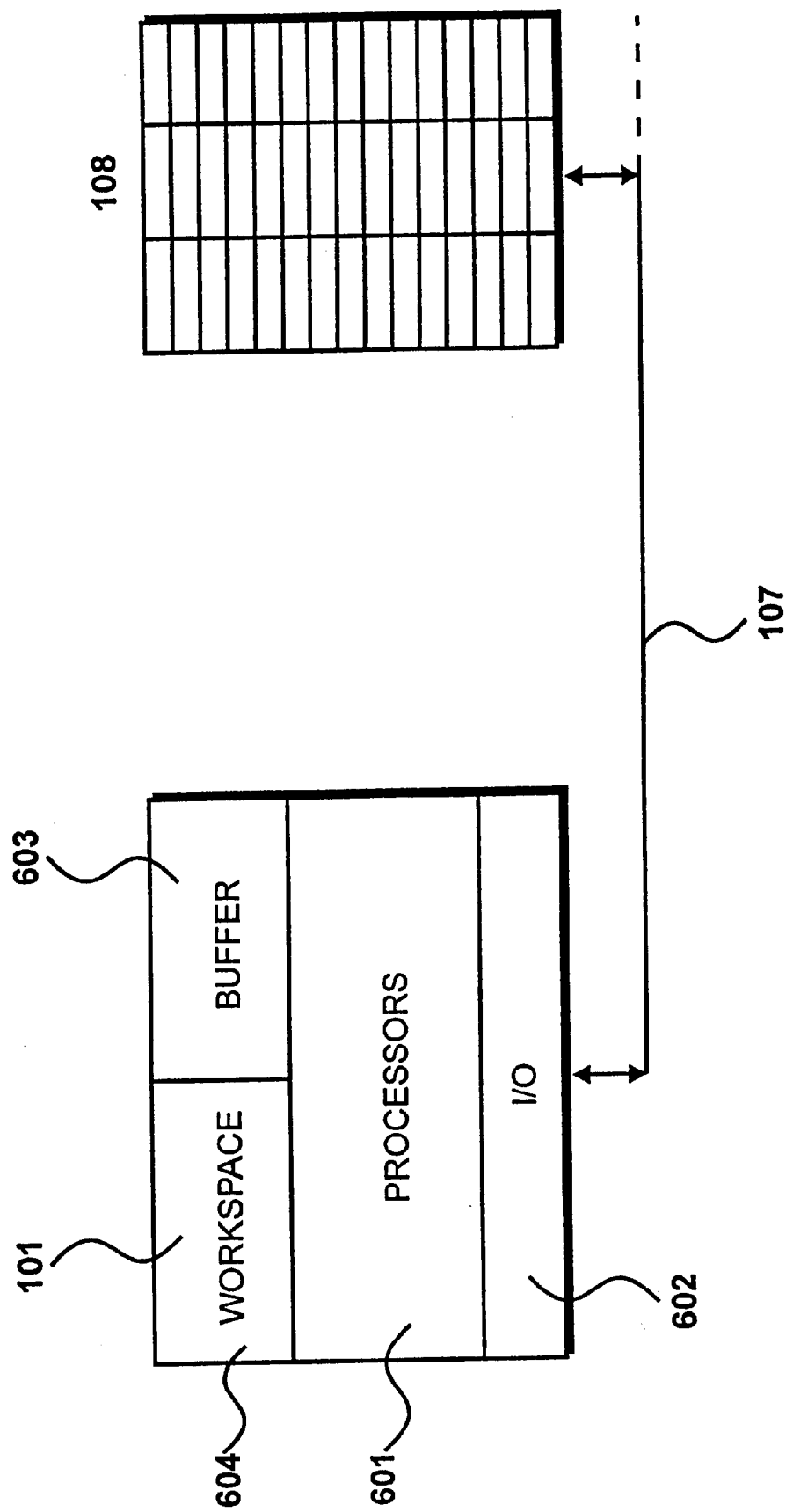
FIG. 6 details the graphics processor shown in FIG. 1.

Details of buffering arrangements for frames of unspecified video frame data sizes are shown in FIG. 6. The graphics processor 101 includes processors 601 and input and output interface circuitry 602 connected to drive arrays such as array 108 via SCSI connections 107. Also included in the graphics processor is an area of memory 603 for buffering image data in order to measure its size before a stripe size is defined. Other memory areas in the graphics processor 101 are used for workspace 604, which is required for intermediate calculations during typical image editing operations.

Typical disk operations are performed in data blocks of 512 data bytes. Thus, each stripe comprises an integer number of these data blocks, even though some degree of wastage may occur.

As shown in FIG. 5, each of the fifteen main drives in the array 108 includes the same subdivision into stripes, but the stripe size is variable. Thus a mechanism is provided by which it is possible to use whatever data space is available in the drive array for whichever format is currently being edited, while maintaining the high bandwidth required for real time image transfer. The subdivisions of the drives shown in FIG. 5 are for diagrammatic purposes only, and many frames of each type of signal may be stored on the array. Thus, in addition to the stripes shown, the pattern of striping would be repeated several times, depending on the number of frames of each type which are stored. Thus, one may consider area 533 on drive 211 to be stripe 0 of the second PAL frame, whereas area 520 is stripe zero of the first PAL frame, and so on.

The example shown in FIG. 5 shows the case for a system set up to provide fifteen stripes. In the case of HDTV editing, this will not provide sufficient bandwidth. Thus, in an alternative arrangement, a combined array of thirty disks plus parity and spare disks, or more, is used, with all frames divided up into thirty stripes or more, the size of the stripes being variable in response to the received image frame data size when writing to the combined array, but the number of stripes being fixed.

Furthermore, video frame data may be considered as a specific instance of high bandwidth data. Thus, the apparatus may be arranged to consider video frames as blocks of data, and other types of data block may be advantageously stored.

A problem exists with the solution described so far, in that variable striping intervals have correspondingly variable degrees of speed efficiency with respect to the access times of the hard disks in the array. Thus, while it is necessary to stripe over thirty drives in order to attain the desired bandwidth for an HDTV signal, striping over thirty disks for a much lower bandwidth signal results in a small amount of data being supplied to each disk in the stripe. When small amounts of data are written to each disk, the head access times, which are in the order of several milliseconds, will predominate over the time taken to transfer the small amount of data, thereby reducing the theoretical efficiency of this system.

The level of efficiency becomes particularly important if the same drive array or arrays is being used by several operators to manipulate images of different bandwidths. This puts the drives in the array under considerable pressure, in that the number of random head movements that are necessary will be increased dramatically. Thus, it is possible for the workload of the system to be restricted unnecessarily by the large number of stripes which are used for small bandwidth image data. Furthermore, disk drive failure is related to the frequency of disk head movements, and it would therefore be advantageous to reduce striping inefficiency for this reason.

In the preferred embodiment, the system is initially configured in accordance with the minimum bandwidth which it is necessary to process. Typically, the smallest bandwidth signal is that used for compressed image proxy frames. These are used to represent higher definition signals, such as NTSC, PAL, or possibly film, at a lower bandwidth, such that images may be displayed on a lower cost graphics workstation, such as a Silicon Graphics Indigo, while maintaining full editorial control over the original high bandwidth image frames.

For example, a sequence from an NTSC image file may be converted into proxy form, for display on a monitor. Video editing personnel may then construct a series of edit decisions, based on what is viewed on the monitor at a low resolution. This may involve reordering various parts of the video sequence and so on. Based on these edit decisions, the results may be previewed, again at reduced resolution. Finally, once the edit decisions have been finalised, they may be applied to the full bandwidth signal, which is not viewable on the monitor. A typical compressed image proxy has half the vertical resolution and half the horizontal resolution of its respective high definition original. This results in a bandwidth reduction of a factor of four.

Compressed image proxies from NTSC or PAL originated data may be efficiently striped across four high capacity hard disks. It is this number which is then used as the basis for configuration of the disk array. The combination of the four disks is considered a sub group. Each sub group of disks includes an additional dedicated parity disk, thus, in this example, each sub group requires five disks. Higher bandwidth signals are striped across integer multiples of sub groups. The combination of sub groups used for striping an individual frame is called a group. The array of drives includes an integer number of sub groups, plus one or a number of spare drives.

As frames are processed by the graphics processor 101 for subsequent storage in an array of drives 108 and 109, the frame is allocated an integer number of sub groups over which it will be striped. Thus, a level of striping efficiency is maintained across multiple data bandwidths, without the need to predefine a particular area or set of disks for use with a particular type of image or block of data.

Thus, in accordance with the description so far, it becomes possible to operate a large disk array for use with a variety of data bandwidths while retaining reasonable efficiency. A typical use for such a system is in an editing studio where more than one editing terminal is in use. For example, a first operator may require access to the disk array while performing digital editing of NTSC video frames. In the course of likely editing events, it is sometimes the case that two frames are required simultaneously. An example of this requirement is when a smooth crossfade is made from one image source to another. Throughout the duration of the crossfade, two NTSC data streams are required.

In the meantime, a second operator may be in the process of editing a High Definition Television sequence of frames. While the system described so far theoretically provides sufficient bandwidth for all this to occur simultaneously, in practice, due to implementation details, some frames may be delayed, resulting in a temporarily frozen display during a full motion sequence.

Figure 7:
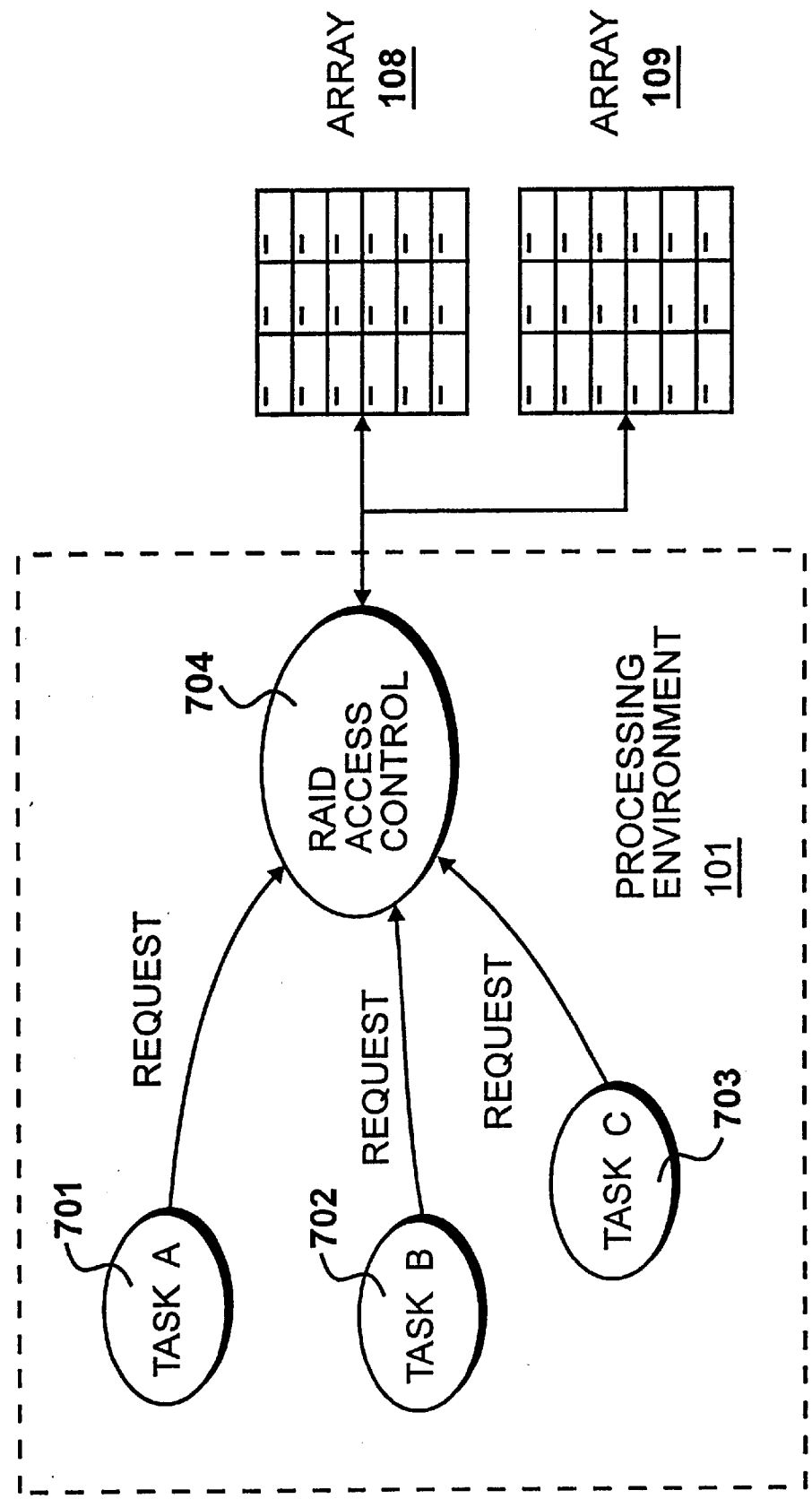
FIG. 7 details requests during a plurality of editing processes operating on the graphics processor shown in FIG. 1, including a RAID access control process.

The problem is illustrated in FIG. 7. Three data processing processes or tasks 701, 702 and 703 are shown which operate in the processing environment of the graphics processor 101. Each of the tasks makes a request for access to the disk array 108 and 109. This request is made via a RAID access control process 704, which is part of the operating system of the graphics processor 101. The RAID access control process 704 supervises access and data transfer between the RAID array, 108 and 109, and the graphics processor 101.

Figure 8A:
FIG. 8A details a timing of disk accesses allocated to the editing processes shown in FIG. 7.

The result of this arrangement is shown in FIG. 8A. The first task which requests access to the disk array is given control for the time requested by the task. In the example shown, task A 701 is the first task to make such a request. A request made by task B 702, shortly after the request made by task A 701, is delayed until the transfer requested by task A 701 is complete. A request made by task C 703 shortly after the request made by task B 702 is delayed even longer, as it has to wait until task B has completed its requested transfer.

Although the transfers requested by each of the three tasks may only be for a single frame, their unpredictability may cause a frame to be delayed by a fraction of a frame interval, or possibly more, if enough such requests are allowed to build up.

Figure 8B:
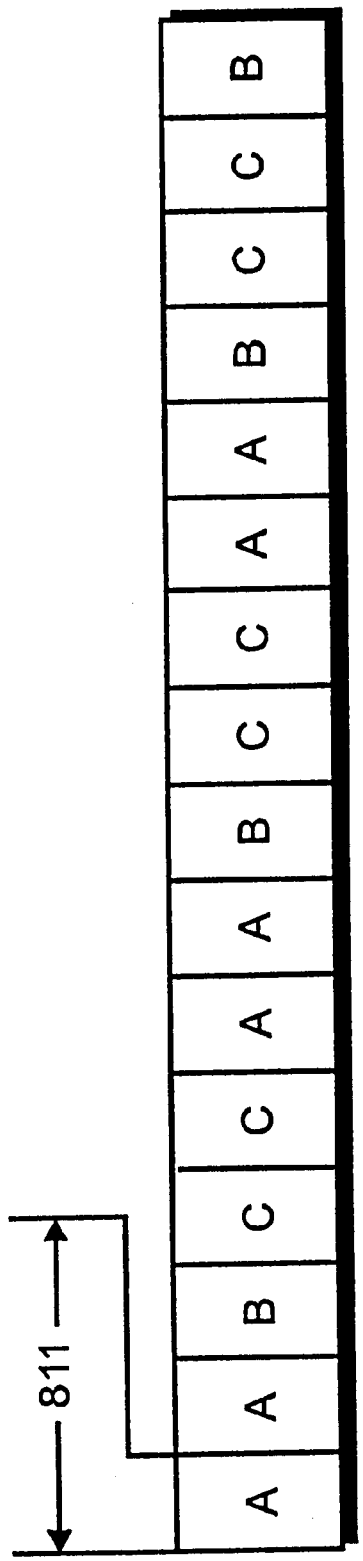
FIG. 8B details an improved timing of disk accesses allocated to the editing processes shown in FIG. 7.

The instantaneous data transfer rate between a task and the disk array is much higher than the average bandwidth of the data that is required, and this fact makes a solution possible. FIG. 8B identifies an improved timing arrangement in response to the requests made by tasks A, B and C shown in FIG. 7. In FIG. 8B data transfer begins soon after any request is made, but is left incomplete because other requests are pending. The delay between a request being made and the first data transfer occurring is affected by the time 811. The time 811 is chosen so as to optimise the relationship between transfer delays and the processing overhead required at the border between each transfer.

Figure 9:
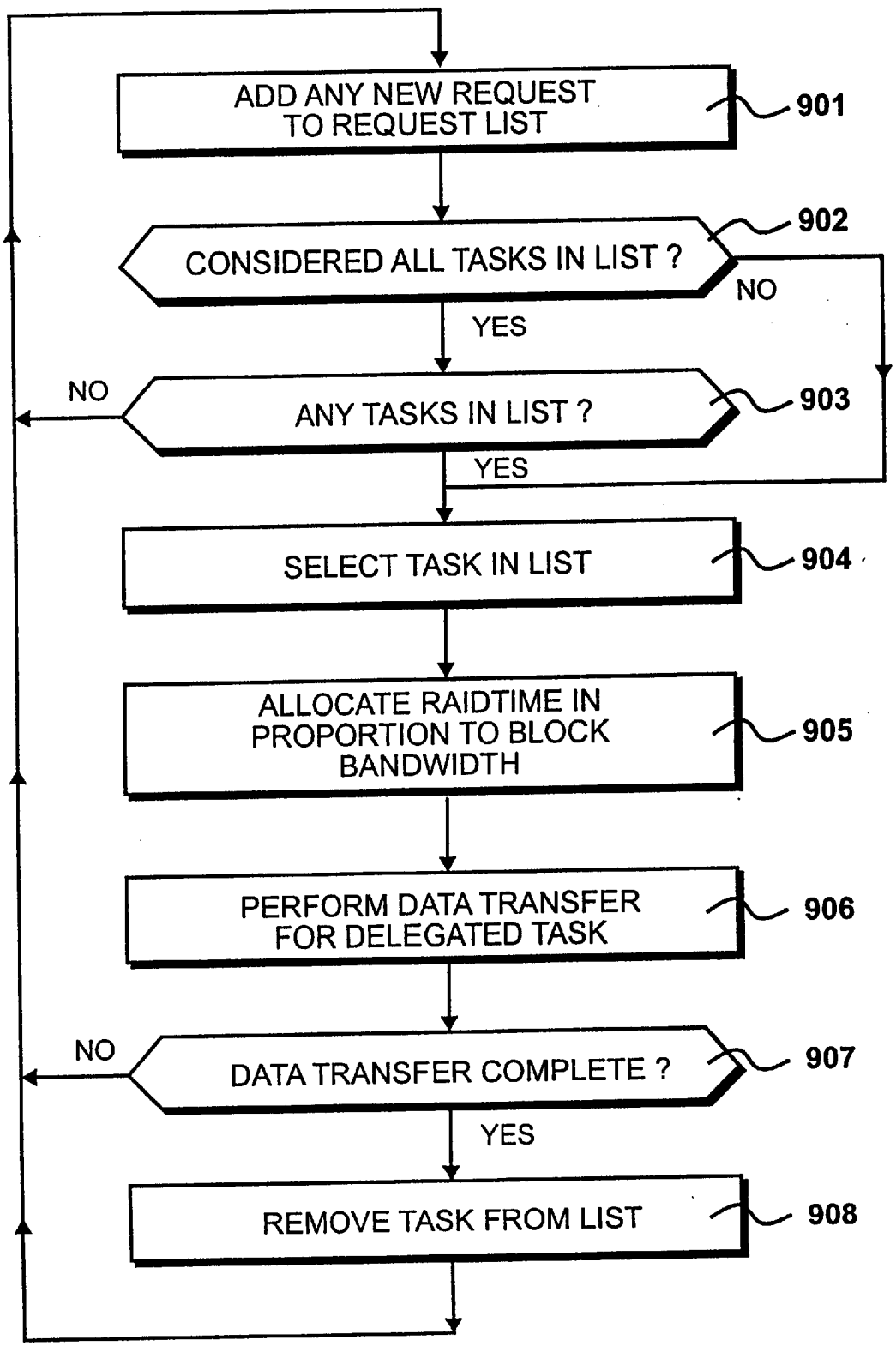
FIG. 9 details the RAID access control process shown in FIG. 7, including a process for adding requests to a request list.

Processes in the RAID access control process 704 for effecting the improved timing arrangement shown in FIG. 8B are detailed in FIG. 9. The processes shown in FIG. 9 may be considered as a continuous loop running in the processing environment of the graphics processor 101. In process 901 any new requests made by tasks running in the processing environment 101 are added to the request list. In practice, there is a limit to the number of requests which may be held in the list at the same time, which is dictated by the total bandwidth required for the transfers which have been requested. Typically, however, this limit is not exceeded, as the limitations of the system will be known by the operators in advance of its use.

In process 902, a question is asked as to whether all tasks in the list have been considered. If the result of this is yes, control is directed to process 903, where a question is asked as to whether there are any tasks in the list. If the result of this question is no, control is directed to process 901, and processes 901, 902 and 903 are repeated until a task actually makes a request.

If the result of process 902 is no, or the result of process 903 is yes, control is directed to process 904, where the next task in the list is selected for consideration. If there is only one task left in the list, this task will have its transfer 4 performed continuously. In process 905, access to the RAID array is allocated in proportion to the bandwidth of the data being transferred. If this proportional allocation is not performed, higher bandwidth data would be delayed proportionally longer than low bandwidth data.

In process 906 the data transfer for the selected task is performed over the allocated time. In process 907 a question is asked as to whether the data transfer is complete. If not, control is directed to process 901, and other tasks in the list will be considered before the remaining data is transferred. Alternatively, if the requested data transfer for currently selected task has been completed as a result of process 906, the task is removed from the list in process 908. Thereafter control is directed to process 901, so that the remaining tasks in the list will continue to be allocated transfer times, until those transfers are completed. Under heavy use, more tasks will be added to the task request list before the list has completely emptied, so as old transfer requests are removed, new ones are added, at a roughly equal rate.

Figure 10:
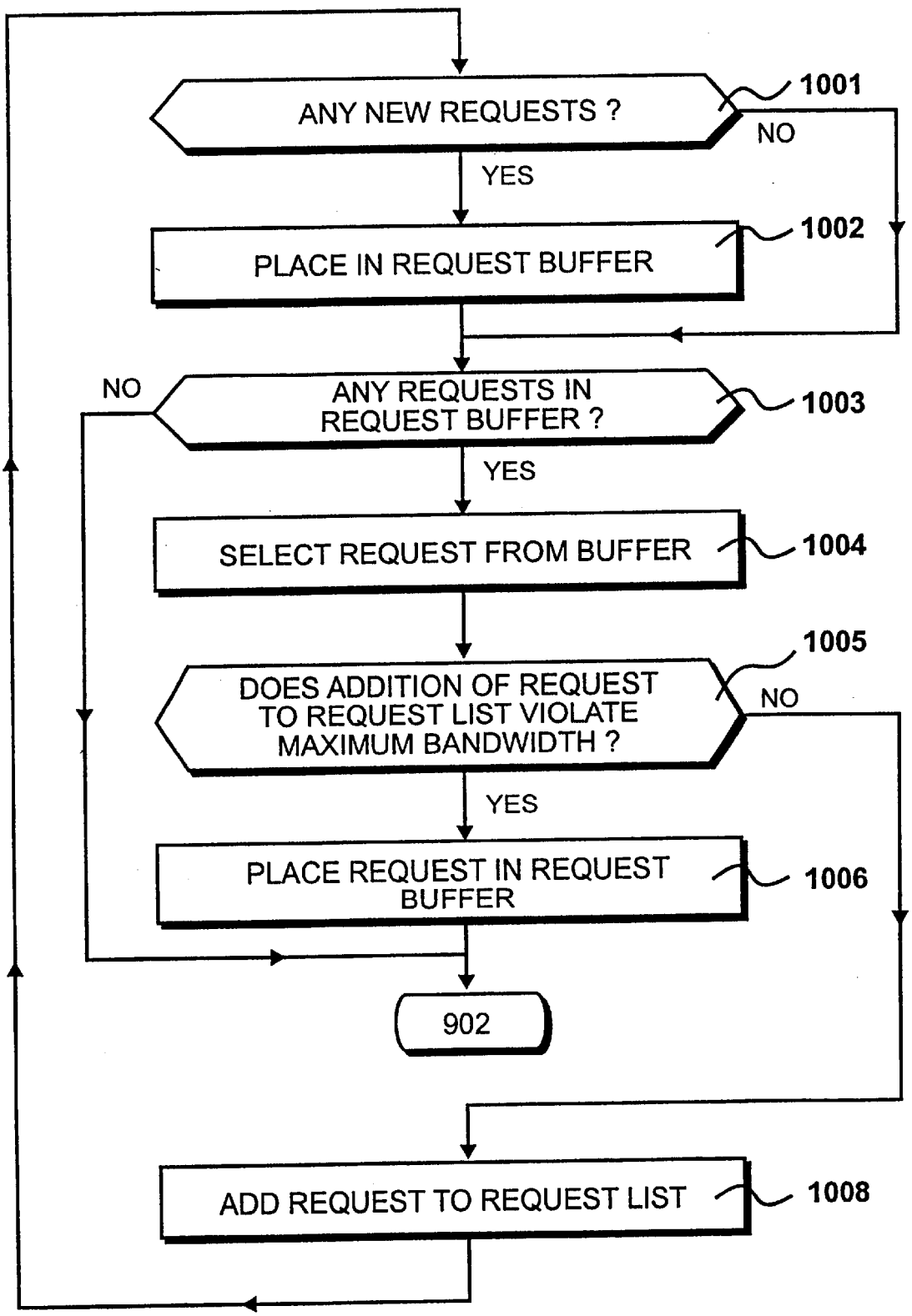
FIG. 10 details the process for adding requests to a request list shown in Figure.

The process 901 shown in FIG. 9 for adding new requests to the request list is detailed in FIG. 10. In process 1001 a question is asked as to whether a task has made a new request for data transfer. If the result of this is no, control is directed to process 1003. Alternatively, control is directed to process 1002, where the request is placed in a first in first out request buffer. Thereafter control is directed to process 1003. In process 1003 a question is asked as to whether there are any requests in the request buffer. If the result of this question is no, control is directed to process 902 shown in FIG. 9. Alternatively, control is directed to process 1004, where a process is selected from the request buffer, and at the same time removed from the request buffer.

In process 1005, a question is asked as to whether the addition of the currently considered request to the request list, operating in FIG. 9, would violate the maximum bandwidth of the system. If the result of this is yes, control is directed to process 1006, where the request is returned to the request buffer, for reconsideration at a later time. Thereafter control is directed back to process 902 in FIG. 9. Alternatively, if bandwidth is available, the request is added to the request list in process 1008. Thereafter, processes 1001 onwards are repeated until either all outstanding requests have been added to the request list, or there is not enough bandwidth to add another request.

The time taken for the head on each disk drive to access the first byte of data in a contiguous block varies depending on the distance the head has to move. Disk drives have two head access times: track or cylinder access time and sector access time. Of these the track or cylinder access time is usually the greater. Each track is a concentric circular path on the rotating disc upon which data is written. When several disks are stacked upon each other in the same drive, as is the case with high capacity drives, the same track on each different disk may be imagined as intersecting an imaginary cylinder. It is for this reason that the term cylinder is sometimes used interchangeably with the term track.

The track access time is determined by the speed at which the head can be accurately positioned to a requested track. The sector access time is the time that elapses before the correctly positioned head reads the sector header pattern rotating beneath it. This depends on the speed of rotation of the disk and the number of sectors on each concentric track. Once the disk head has been correctly positioned, data can be read or written at a high speed, so it is particularly important to minimise the ratio of time spent positioning the head to the time spent reading or writing the data.

Figure 11A:
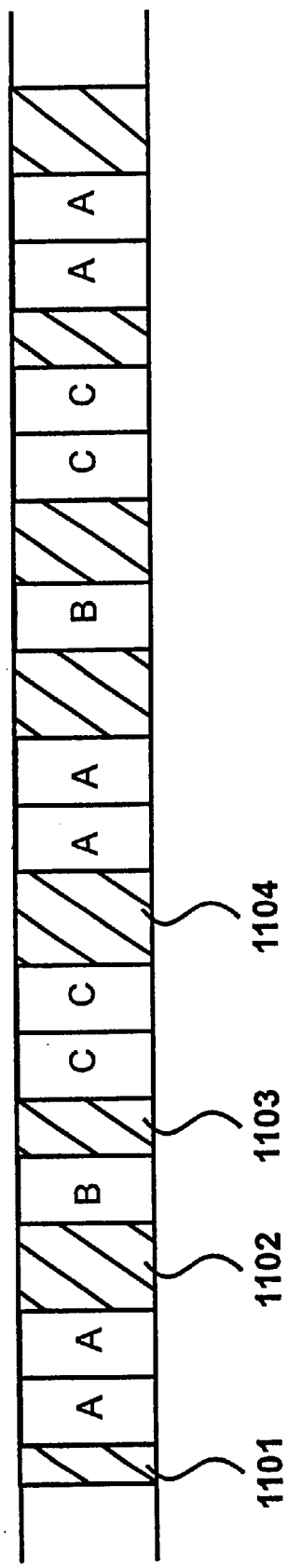
FIG. 11A shows timing of disk accesses allocated to the editing processes shown in FIG. 7, including head access times.

When head position is not taken into account, the true timing diagram for data access shown in FIG. 8B may look more like the one shown in FIG. 11A. A small head access time 1101 precedes the first batch of data which is read for task A. However, the data for task B is a significant number of tracks distant from the data for task A, so a long head access time 1102 is required before the correct sector is located. The data for task C is located not far from the data for task A, but because the data for task B was distant from the data for task A, the head must repositioned again, taking time 1103 to find the correct sector. Movement of the head from the last sector written to by task A to the first sector for task B requires head access time 1104.

Figure 11B:
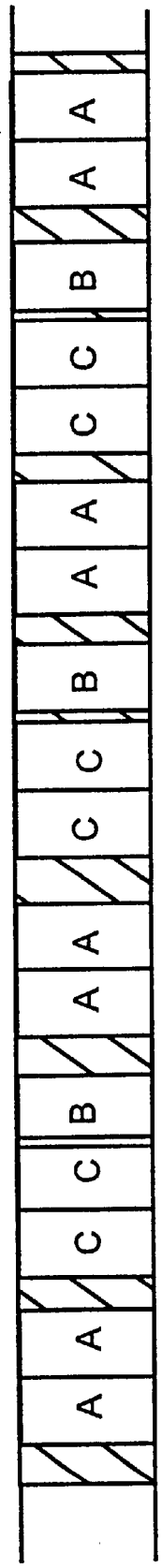
FIG. 11B shows timing of disk accesses allocated to the editing processes shown in FIG. 7, including reduced head access times.

By taking into consideration the physical locations of sectors on the disk, it is possible to improve overall data bandwidth with only a slight increase in delay to access. FIG. 11B shows a re-ordering of task access, thereby achieving a significant overall increase in throughput. In the example shown, it is known that the tracks required for task C lie between the tracks for tasks A and C. Thus the task access order is A,C,B. This results in removal of unnecessary head movements, and thereby increases the overall available bandwidth of the drive array.

Figure 12:
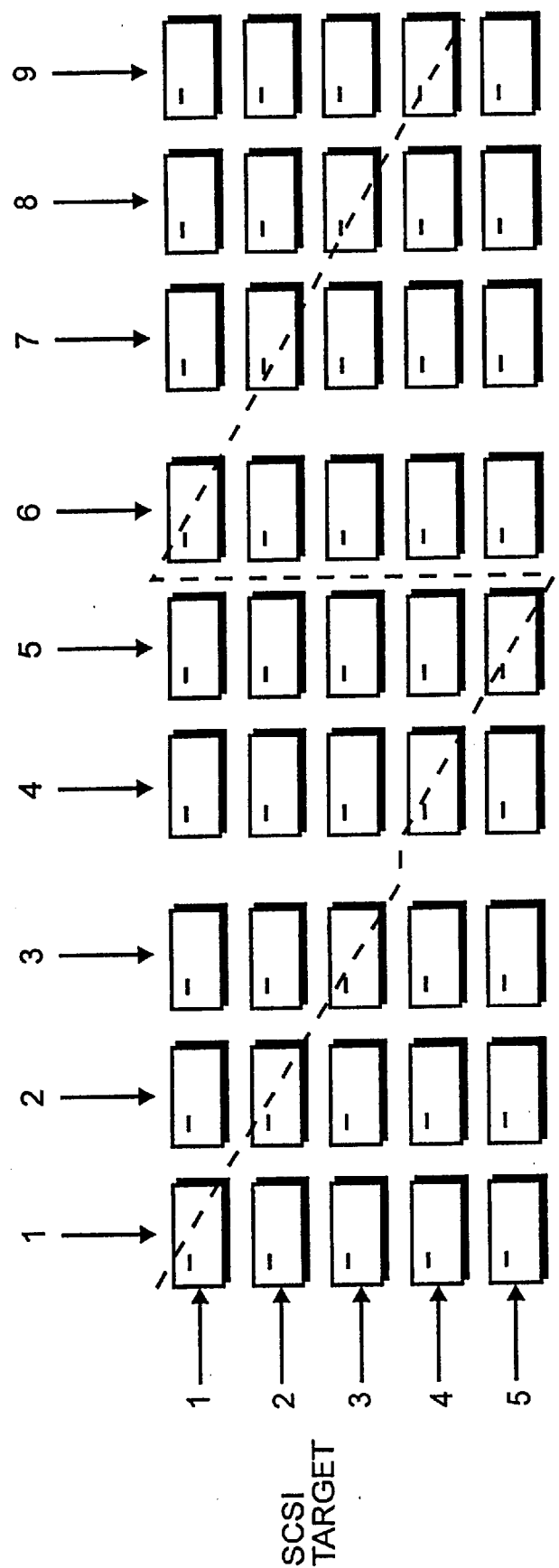
FIG. 12 shows an array of forty-five disk drives having an improved access pattern.

An array of forty-five high capacity hard disk drives is shown in FIG. 12. Each column of disks is controlled by a particular SCSI channel. Columns are arranged in groups of three, relating the fact that the SCSI interface card which is used in the Silicon Graphics Onyx graphics processor has three SCSI channels. Thus three of such interface cards are used for the arrangement shown in FIG. 12, or two cards for the arrangement shown in FIGS. 1 and 2.

Each SCSI channel controls five disk drive targets. Communication between the graphics processor 101 and a disk on a particular channel and target may be considered as being effected over a particular path. Having made decisions as to the number of drives in a particular stripe for a particular frame, and the order in which access will be provided by the RAID access control process 704, it is necessary to select disks from the array across which the stripe will be written. SCSI targets have the quality that, the lower their number, the higher their bus priority. Thus, a disk which is sited at SCSI target number 1 will be able to communicate in precedence to disks sited at higher numbered targets on the same SCSI channel.

The obvious solution is therefore to stripe through targets one to five, thereby spreading the overall priority assignation for a particular frame or data block. However, this places an uneven burden on individual SCSI channels. Considering a stripe across fifteen disks, starting at channel 1 target 1, the stripe continues through targets 1 to 5 of channel 1, then targets 1 to 5 of channel 2 and finally 1 to 5 of channel 3. This concentrates data transfers over SCSI channels 1, 2 and 3, while channels 4, 5, 6, 7, 8 and 9 are idle.

In order to optimise priority equalisation, the disks are assigned diagonally, as shown in FIG. 12. Thus, striping begins on the disk at channel 1 target 1, then channel 2 target 2, and so on, wrapping around as necessary. In this way, no particular frame gains a significant priority advantage over another, from the same or a different source, and the full bandwidth capability of the available SCSI channels is utilised with a high degree of efficiency. Selection of disks for a stripe is performed by the RAID access control process 704 operating in the graphics processing environment on the graphics processor 101. Selection of disks may be considered as a selection of paths through the SCSI circuitry to a particular disk target. Preferably parity disks in a group or sub group are assigned the lowest SCSI target number and thereby obtain the highest priority.

During manufacture it is accepted that areas on a hard disk will be unusable. Thus, when a hard disk drive is used, it is necessary to access a table of those sectors on the disk which are marked as unusable. This table is stored on the disk itself, as it is unique to that disk. Furthermore, a sector may become unusable after some period of use, and this sector may be added to the table of unstable sectors for that disk. Typically, a hard disk drive is specified to contain a certain number of useable sectors, which exceeds those required for a specific application. Thus, if a few sectors become unusable, these may be replaced by other spare sectors.

Individual sectors become unusable largely as a result of defects in the surface of the disk, resulting from small particles of dirt etcetera which have been trapped in the mechanism at the time of manufacture. A level of this type of malfunction is accepted as a trade off with the cost of manufacturing disks in an expensive heavily filtered clean air environment.

The occasional read or write error is expected in the operation of a disk drive, so sectors are not considered unusable until repeated access attempts have failed. Typically two such repeats are performed before the error is considered permanent.

Other sources of disk error are more serious. For example, the movement of the stepper motor which selects the appropriate track or cylinder which is currently being accessed may deteriorate due to mechanical failure of bearings and so on. In these cases it is possible for an entire disk to be rendered unusable, and it must be replaced.

As described previously, striping occurs over sub groups of disks. Associated with each group or sub group is a parity disk, which contains exclusive-OR parity data which may be used to detect errors in readings from the other drives in the group, and furthermore, to reconstruct data should such an error be detected. Data on a RAID may be considered as having one of two possible conditions. Firstly, and most commonly, data is protected. Thus, if a drive storing protected data should partially or completely fail, the missing data may be reconstructed. Secondly, data may be unprotected. This condition exists after drive failure has occurred and before the system has had time to reconstruct the missing data. Thus, if a second disk error were to occur for unprotected data, the data would be unrecoverable.

During RAID operations, the RAID access control process 704 marks data as being protected or unprotected. If data is unprotected, steps are taken to reproduce it, by writing the reconstructed data to a spare sector of the corrupted disk, or to a sector on a spare disk which has been logically included into the sub group as a result of a complete disk failure. It is possible for data to be written to its new sector on the same or a new disk while at the same time transferring said data to its respective application. This cuts down on the interference with normal operations of the RAID while maintaining automatic data repair.

In a preferred embodiment, data repair is a background process which takes place whenever unprotected data exists on the array. Serious errors are flagged to the operator of the system in order to pre-empt the possibility of data being permanently lost if at all possible, for example, in case a new spare drive is required.

In the case when a spare drive is logically mapped to the position of a faulty drive, the spare drive modifies the overall performance of the system due to the prioritized nature of the SCSI targets, and the bandwidth restrictions of any given SCSI channel. Thus, after a drive has been logically remapped to replace a faulty one, the system will exhibit a degree of imbalance. This imbalance may be detected, and the operator warned. The implications of the imbalance are typically not serious, so critical ongoing editing activities need not be interrupted. However, when it is more convenient, the spare drive may be physically moved to the location of the original faulty drive, in order to enable groups to be accessed with the same highly optimised pattern that was used before the disk failure occurred.

In relation to FIG. 12, if a disk crash occurs, the optimised pattern which is shown would be modified due to the inclusion of a spare disk drive, probably at a SCSI target of six. Thus, the system may precede for a while in this unbalanced condition, but preferably the operator should place the spare disk into the old location of the broken disk, so that the most efficient access pattern is used.

A Second Preferred Embodiment

Figure 13:
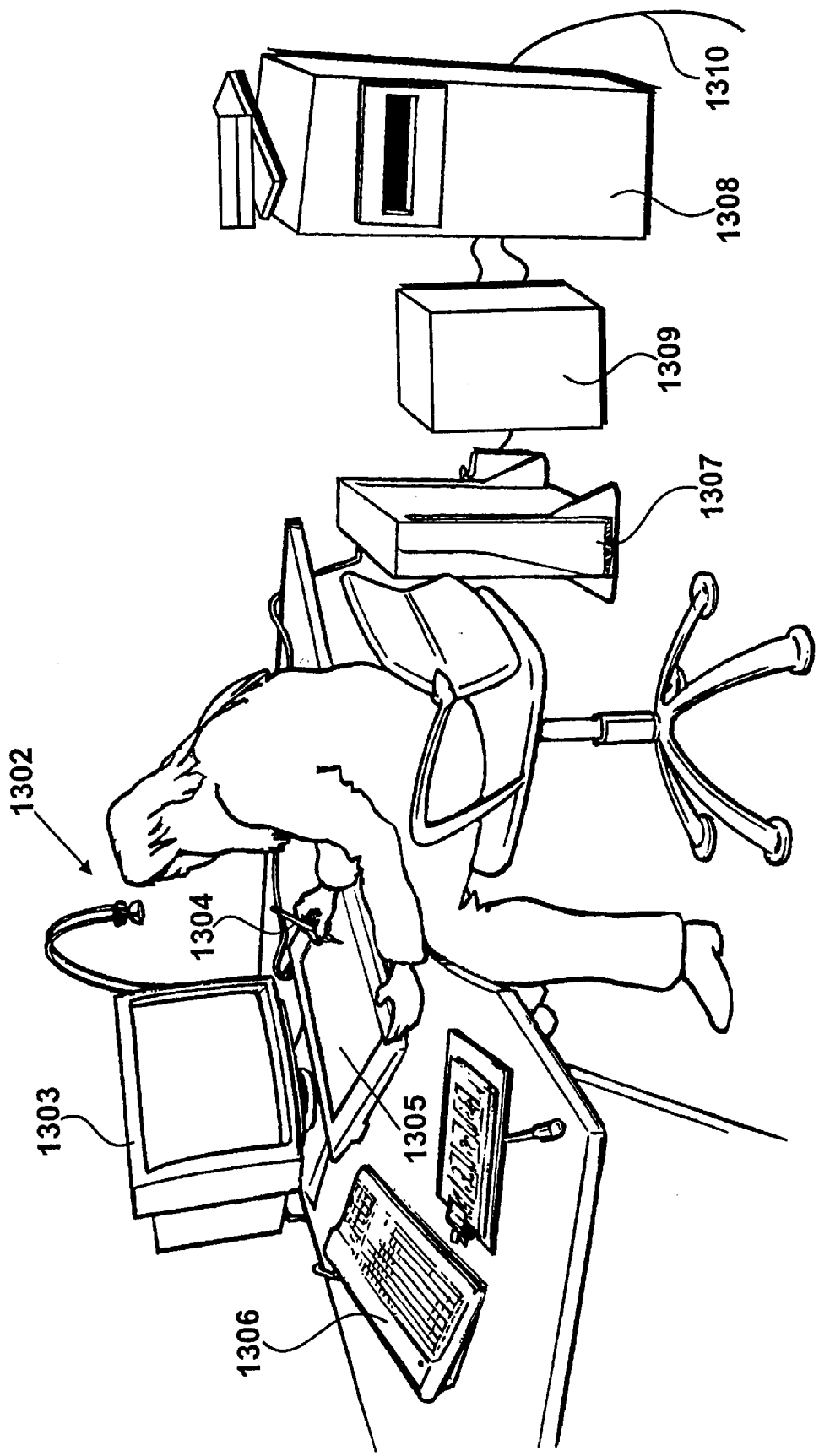
FIG. 13 shows a post-production video facility of a second embodiment, using an application for modifying image frames, including an applications platform, a video tape recorder and an image processing system providing real time communication between the applications platform and the tape recorder.

A post-production facility is illustrated in FIG. 13, in which a video artist is seated at a processing station 1302. Images are displayed to the artist via a visual display unit 1303 and manual selections and modifications to the displayed images are effected in response to manual operation of a stylus 1304 upon a touch tablet 1305. In addition, a conventional keyboard 1306 is provided to allow alphanumeric values to be entered directly. The monitor 1303, tablet 1305 and keyboard 1306 are interfaced to an image manipulating workstation 1307, such as an Indigo Max Impact, manufactured by Silicon Graphics Inc., running compositing applications, such as "FLINT or "FLINT RT" licensed by the present applicant.

Image data may be supplied to the workstation 1307 from a D1 digital video tape recorder 1308 via an image processing system 1309. The video tape recorder 1308 and the processing system 1309 are both controlled directly in response to commands issued by the artist, thereby effectively embedding the operation of these machines within the application's environment. Processing system 1309 is arranged to receive video data from the video recorder 1308 at video rate and is arranged to write said data to its own internal storage devices at this rate. The processing system 1309 is then in a position to make this recorded data available to the workstation 1307, or to similar devices via a high bandwidth network, such as "HiPPI", via a network cable 1310.

Figure 14:
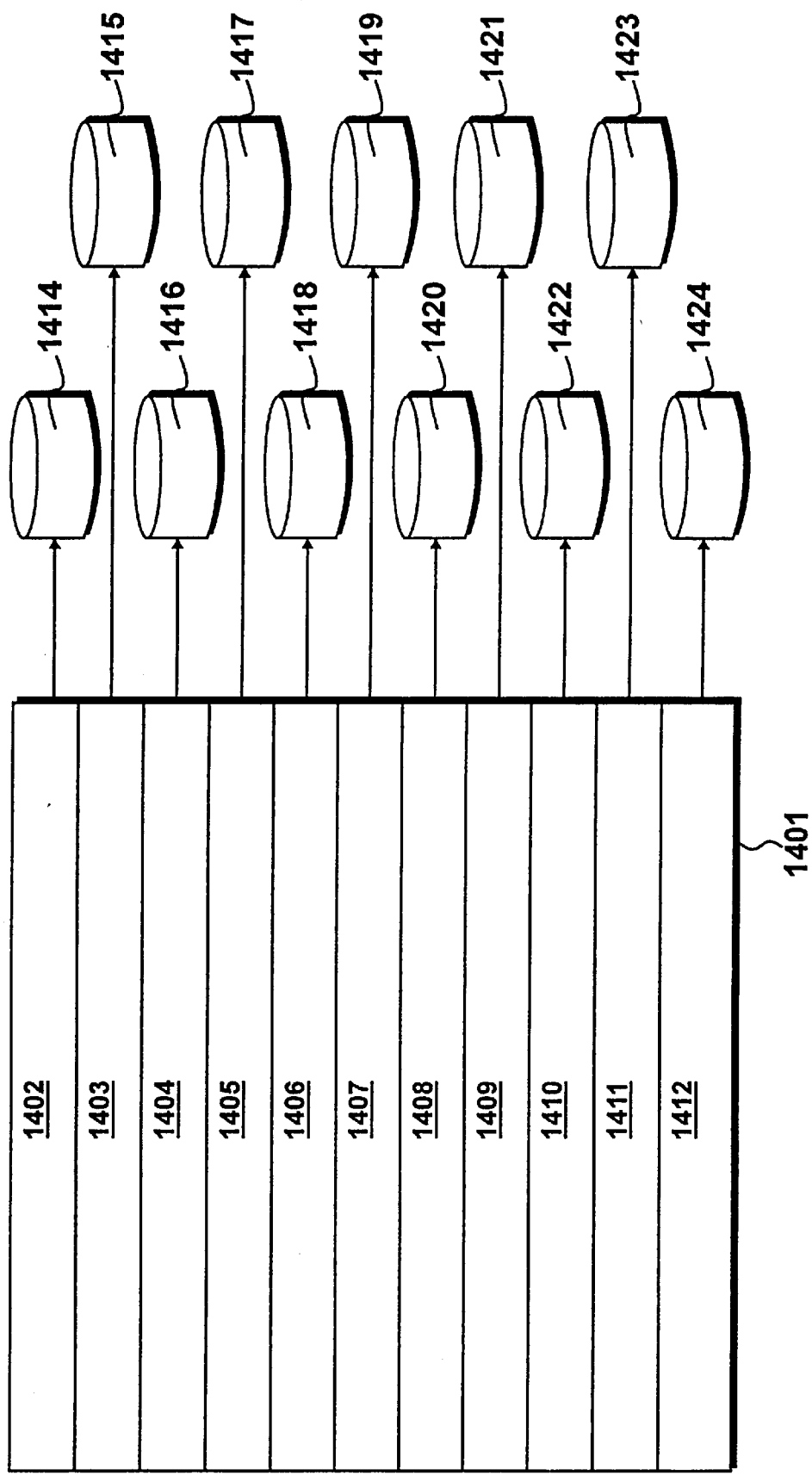
FIG. 14 details the image processing system shown in FIG. 13, including a video buffer, a router, a color space converter, a proxy generator, a reformatter, a disc buffer, a network buffer, a parity generator and a PCI bus.

A video frame 1401 is shown in FIG. 14. A conventional video signal is transmitted by scanning the image from its top left corner to its bottom right corner. A line is initiated by a line blanking period, representing the left edge of the frame. A A line of information is then transmitted, representing a horizontal scan across the image, terminating with line blanking, or the right edge of the frame. Thereafter, the next line of data is transmitted and so on until a complete field of data has been transmitted. This is then followed by an interlaced second field, displaced vertically from the first field so as to create a complete frame of data.

In the storage environment of FIG. 13, data is written to a local array of disks within processing system 1309. In this environment, data is stored as complete frames which, if necessary, will have been derived from two fields of data. Preferably, a complete frame of data would be scanned from its top left position to its bottom right position but the bandwidth required for such a transfer is not obtainable from commercially available disk storage devices. Consequently, in order to store a frame of data at video rate, the frame is divided into a plurality of stripes, with each stripe being written to its own respective disk storage device. In the example shown in FIG. 14, a conventional broadcast image has been divided into a total of eleven stripes 1402–1412. A frame of data is read from a frame buffer in response to addresses being supplied to said buffer. In this way, addresses may be supplied to the buffer in a substantially random way, thereby allowing data to be read from each of the stripes, so as to supply data to a plurality of disks in parallel. Thus, stripe 1402 is read with the data derived from said stripe being supplied to a disk storage device 1414. Similarly, stripe 1403 is read with the resulting data being written to disk 1415. In parallel with this, stripe 1404 is read to provide data to a disk 1416, with data read from stripes 1405,1406,1407,1408, 1409,1410,1411 and 1412, being written to disks 1417, 1418, 1419, 1420, 1421, 1422, 1423 and 1424 respectively.

A bus connecting frame 1401 to the array of disks 1414 to 1424 may be arranged to transfer one data pixel at a time. These pixels are then buffered by a suitable disk adapter, such as an SSA adapter, whereafter the data is then directed to it's appropriate disk storage device. Thus, a bus connecting the frame buffer to the disks may have sufficient bandwidth to transfer all of the data in real time, whereafter said data is directed to a plurality of disks such that each individual disk transfers data at a lower rate, compatible with its operating characteristics.

The SSA adapter associated with disks 1414–1424 will activate the disks so as to effect data transfer in the opposite direction. Each disk will attempt to deliver requested information, resulting in a bus contention situation existing within the adapter. The adapter itself will take whatever information is available, determined by mechanical operating characteristics of the individual disk and associate an appropriate address with whatever data becomes available. In this way, it is possible for the data to be reconstituted within the frame store, although this transfer will take place in a random fashion as the data becomes available from the disks. Thus, it can be seen, that when transferring data from disks as a plurality if stripes, it is necessary to provide buffering capacity for an entire frame, whereafter, if required, the data from said frame may be read sequentially.

A problem with the system illustrated in FIG. 14 is that the whole image frame would become corrupted if one of the disks were to fail. Clearly, as the number of disks in an array increases, the chances of one of said disks failing also increases, thereby jeopardising the overall integrity of the system.

Figure 15:
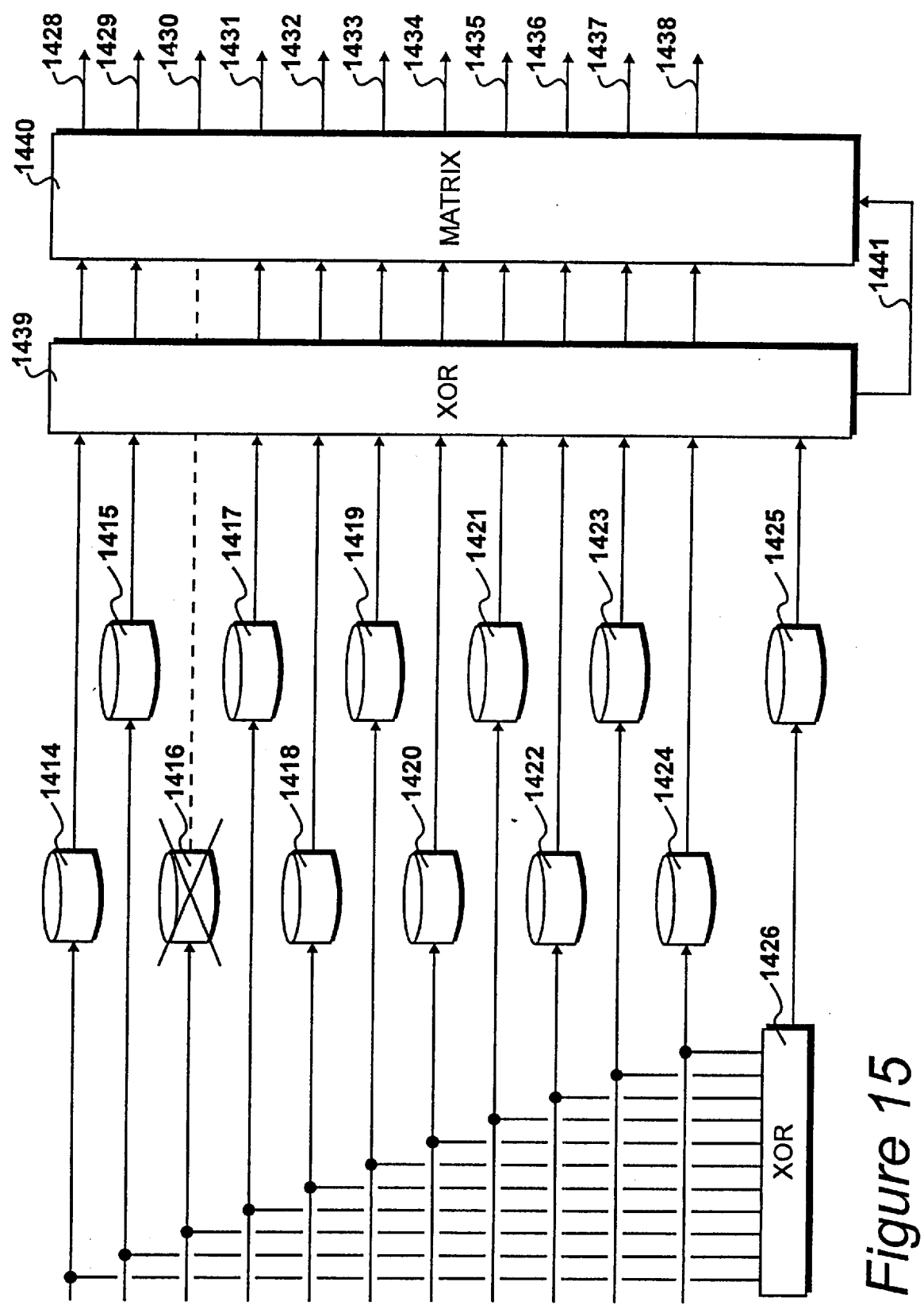
FIG. 15 illustrates the striping of image frames to a plurality of disks.

Disk arrays of the type shown in FIG. 14 are capable of operating in a protect mode, as illustrated in FIG. 15. Disks 1414 to 1424 are provided in the arrangement shown in FIG. 15, each configured to receive data from a respective stripe 1402–1412. In addition, a twelfth disk 1425 is provided, configured to receive parity information derived from the image data supplied to the other eleven disks 1414–1424.

Combinational logic circuit 1426 receives inputs from each of the data streams being supplied to disks 1414–1424. An exclusive OR operation is applied to all eleven pixel values derived from corresponding positions within the video stripe. This results in the related parity data being written to parity disk 1425, effectively in parallel with the data being written to disks 1414–1422.

In normal operation, disks 1414–1424 may be read in parallel to produce outputs on output lines 1428–1438. It should be understood that the arrangement shown in FIG. 15 is merely illustrative and does not take account of timing considerations due to the mechanical characteristics of the disks. Thus, it represents an idealized illustration of the RAID environment. The outputs from disks 1414–1424 pass through a further exclusive OR system 1439, followed by a switching matrix 1440. When all of the disks 1414–1424 are operating correctly, systems 1439 and 1440 are effectively transparent.

The parity data stored on disk 1425 is used if any of disks 1414–1424 fail. In the example shown in FIG. 15, disk 1416 has been crossed out, illustrating a disk failure such that no data is now available from this disk. Consequently, exclusive ORing system 1439 is now only receiving data input from ten stripes, such that it would not be possible to represent the data originally contained within stripe 1404. On detecting this condition, exclusive ORing system 1439 and matrix 1440 are activated. The exclusive ORing system 1439 produces the exclusive OR of all of its ten data inputs plus the parity input 1425. The result of this operation is that the missing data, originally stored on disk 1416, is regenerated, resulting in this data being supplied to matrix 1440 over connection 1441. Within matrix 1440, it is possible for the input supplied on line 1441 to be directed to any of the outputs 1428–1438. Thus, in the example shown, data supplied on line 1441 is directed to output line 1430 within matrix 1440.

Figure 16:
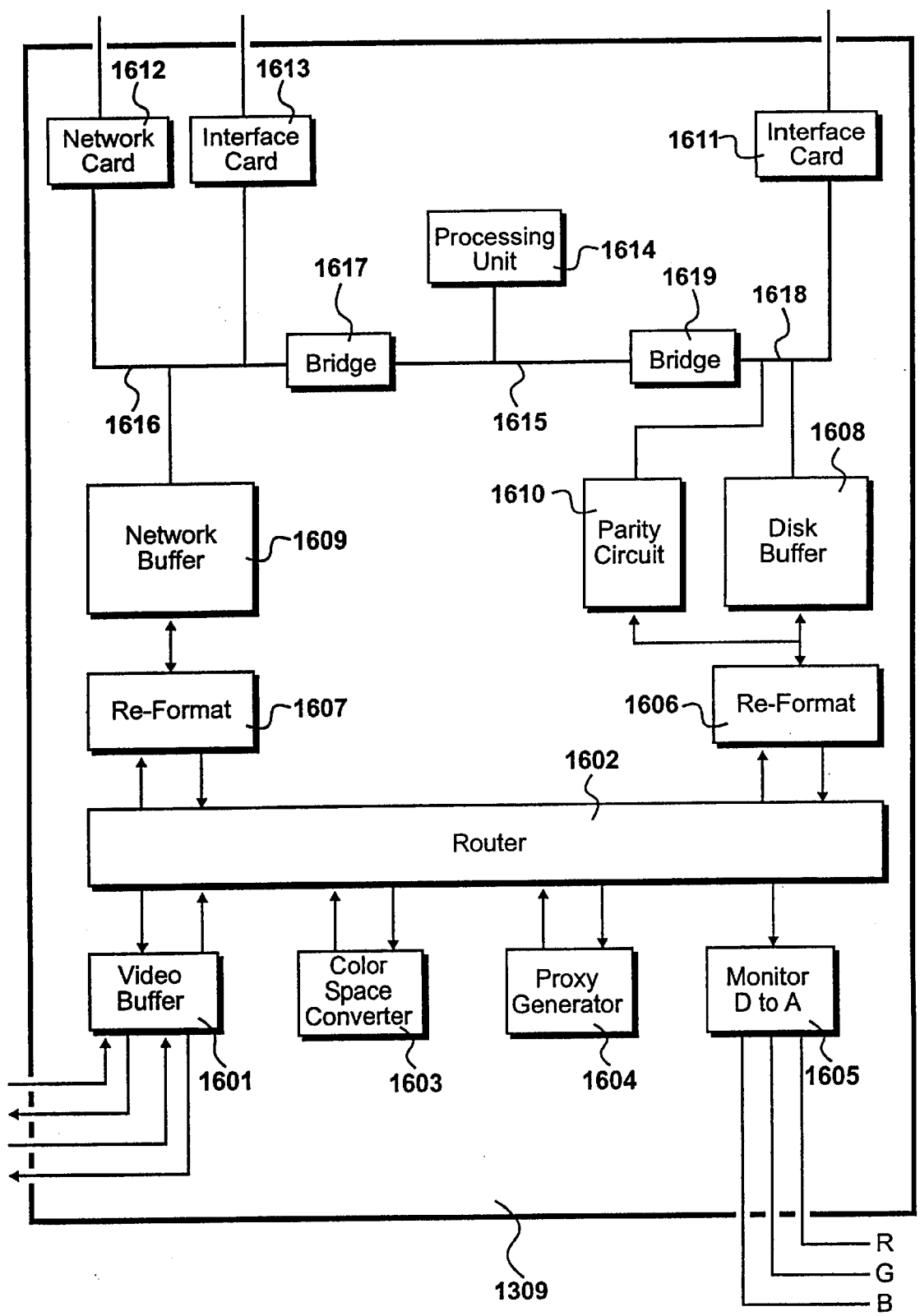
FIG. 16 illustrates the generation and storage of parity information, to provide redundancy in case of disk failure.

Image processing system is detailed in FIG. 16 and is controlled by a programmable processing unit 1614, which is responsible for coordinating activities within the processing system and for downloading instructions to specific components within the processing system. In the preferred embodiment, processing unit 1614 is implemented as an Intel microprocessor communicating with a primary thirty-two bit PCI bus 1615 clocked at 33 megahertz. The primary PCI bus 1615 allows processing unit 1614 to supply memory mapped control signals to associated processing subsystems. However, the primary bus 1615 is not used for the transmission of image data. The mechanism for transferring image data within the image processing system 1402 is the router 1602, with transfers also taking place via one or both of buffers 1608 and 1609.

Network buffer 1609, network card 1612 and interface card 1613 communicate via a secondary PCI bus 1616, which may be considered as a network bus. Secondary bus 1616 is connected to primary bus 1615 via a PCI bridge 1617. Bridge 1617 is configured to allow control information to be transmitted from primary bus 1615 to secondary bus 1616 as if the bridge 1617 effectively did not exist. However, data lying outside a specified address range will be treated as data and as such bridge 1617 will be perceived as being closed. Consequently, any image data supplied to secondary bus 1616 can communicate between network card 1612, interface card 1613 and network buffer 1609 but cannot be conveyed to the primary bus 1615 via the bridge 1617, which will be seen as open.

A similar arrangement is provided for communication between the disk buffer 1608 and the disk interface 1611. A secondary PCI bus, which may be considered as the disk bus 1618 is connected to the primary PCI bus 1615 via a second PCI bridge 1619. Bridge 1619 allows control information to be transferred from the processing unit 1614 to the interface card 1611, its associated SSA adapter and to disk buffer 1608. However, the bridge 1619 is effectively open for the transmission of image data, such that image data supplied to the network bus 1618 is blocked from reaching the primary bus 1615. Consequently, no major burdens are placed upon the processing unit 1614 and its associated primary bus. Processing unit 1614 is only concerned with configuring other subsystems and is not itself directly responsible for controlling the transfer of image data via bus mastering or other techniques.

Data transfers within the image processing system 1309 preferably take place within RGB color space. Consequently, D1 video signals supplied to the video environment 1604 are color-space converted within said environment using conventional dedicated circuits employed in digital video systems. However, signals supplied to the processing system 1302 from the video environment are sequentially clocked, consist of interlaced fields and include field blanking, these would normally be perceived as video signals. The addressed environment includes an interface card 1611 for supplying data to the disks. Data supplied to the disks is effectively data like any other type of data and, as such, the fact that it represents image frames is immaterial to the operation of the SSA environment.

Video buffer 1601 effectively consists of two buffers each arranged to convey two real-time video streams to router 1602 at 27 megahertz. Each of these individual buffer circuits may therefore simultaneously receive a D1 video stream at 13.5 megahertz while transmitting a similar stream at 13.5 megahertz.

Figure 17:
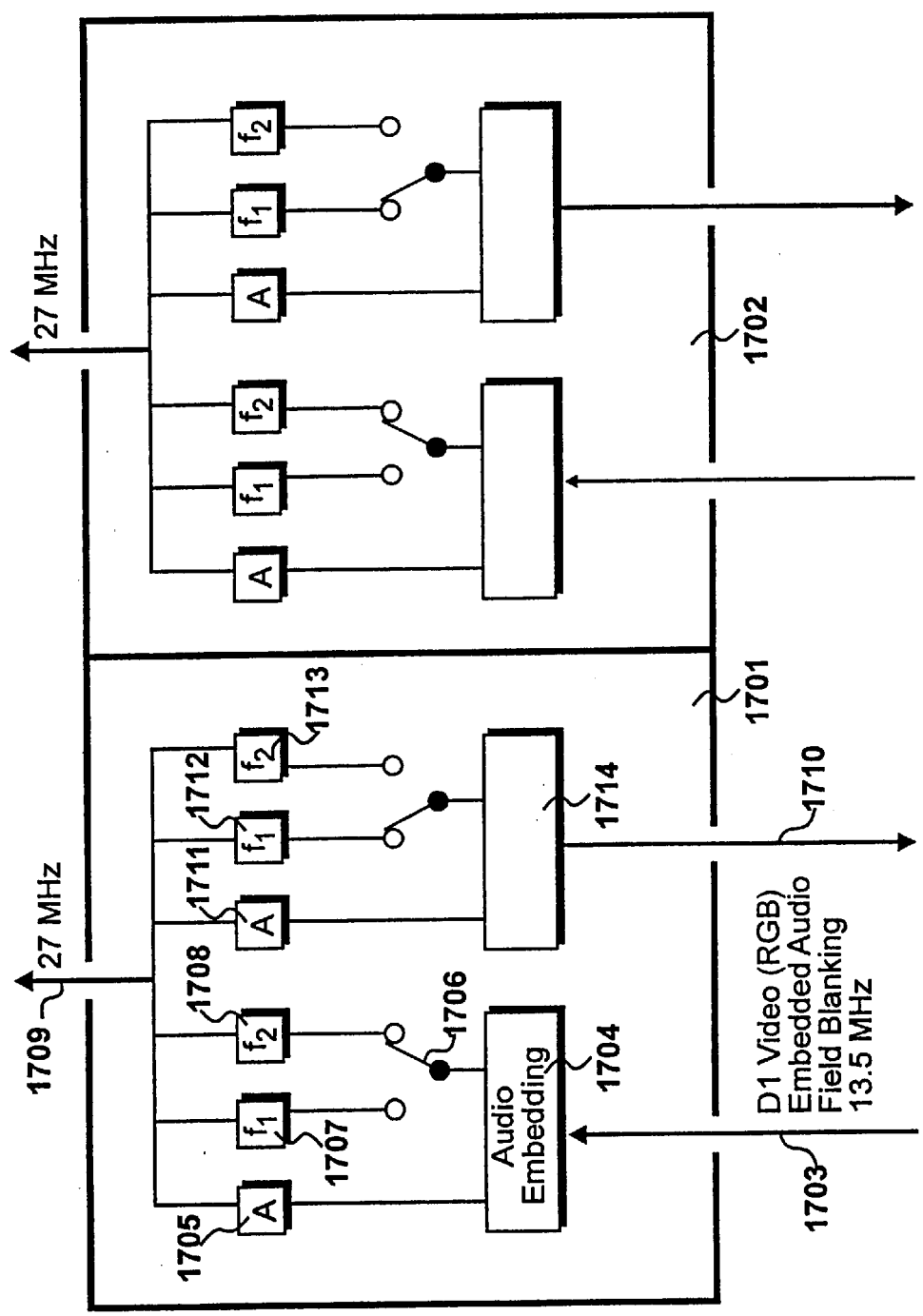
FIG. 17 details the video buffer identified in FIG. 16.

Buffer 1601 is detailed in FIG. 17, consisting of a first buffer circuit 1701 and a substantially similar second buffer circuit 1702. The first buffer circuit 1701 will be described and it should be understood that substantially similar operations are effected by the second buffer circuit 1702.

An incoming D1 video stream, color converted to RGB, is received on an input serial line 1703. The incoming data may include an audio embedded stream and includes field blanking. The audio embedded stream is separated by audio embedding circuit 1704 and supplied to an audio buffer 1705. A switch 1706 directs incoming video data to a first field store 1707 or to a second field store 1708. Each field store is arranged to store only video data and does not store field blanking. Thus, the process of writing the serial stream to one of said stores effectively removes the field blanking from the video stream such that, thereafter, the data is transmitted as substantially contiguous blocks.

The field buffers 1707 and 1708 provide double buffering such that as data is written to the second field buffer 1708, in accordance with the configuration shown in FIG. 17, data previously written to the first field buffer 1707 may be read as parallel thirty-two bit words at twenty-seven megahertz for application to the router 1602 over bus 1709. The reading process will also access audio buffer 1705, thereby adding audio data to the twenty-seven megahertz data stream.

Within a field period, it is also possible for data to be received from bus 1709 for application to output serial digital link 1710. The field period is divided into two sub-periods, within the twenty-seven megahertz domain, and in said second sub-period audio data may be written to audio buffer 1711, with a field of video data being written to field store 1712 or field store 1713. Under the configuration shown in FIG. 17, incoming data is written to the second field store 1713, allowing the first field store 1712 to be read serially at 13.5 megahertz to provide a serial stream to the audio embedding circuit 1714. At circuit 1714, audio data is embedded in accordance with the AES protocol by reading audio data from audio buffer 1711. Interlaced RGB video with field blanking, at 13.5 megahertz is then supplied to output channel 1710. Thus, the reading of field buffers 1712 or 1713 is appropriately delayed in order to introduce the required field blanking intervals.

Figure 18:
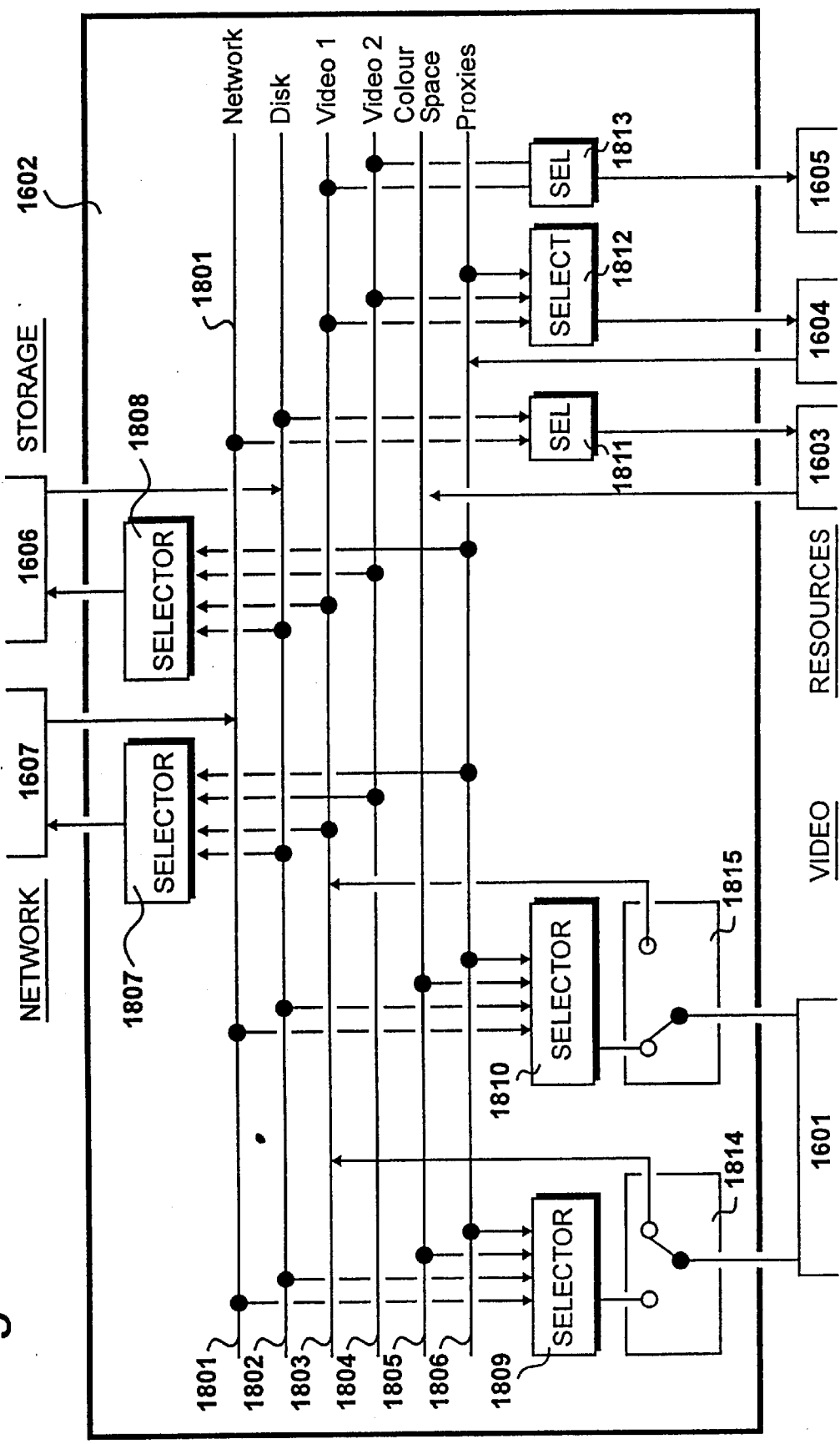
FIG. 18 details the router identified in FIG. 16.

Router 1602 is detailed in FIG. 18 and is fabricated around six thirty-two bit buses clocked at twenty-seven megahertz. The transfer of image data in this mode represents the preferred transmission protocol within the processing system. It is conveyed along the parallel bus, similar to data transmission but this bus is synchronized at twenty-seven megahertz and does not require an associated address bus. A first thirty-two bit bus 1801 receives networked data from the reformatting device 1607. The second thirty-two bit bus 1802 receives disk information from the storage devices via reformatting circuit 1606. The third bus 1803 receives a first video stream from video buffer 1601, while the thirty-two bit bus 1804 receives the second video stream from data buffer 1601. The fifth thirty-two bit bus 1805 receives the output from the color-space converter 1603, with the sixth bus 1806 receiving a similar output from the proxy generator 1604.

Routing is effected via the buses because in addition to the six input sources, seven output destinations are connected to the bus. The first selector 1807 receives input from the disk bus 1802, the first video bus 1803, the second video bus 1804, and the proxy bus 1806. Selector 1807 receives instructions from the processing unit 1614 to select one of these sources and thereafter the selected source is applied to the network reformatting circuit 1607.

A second selector 1808 receives an input from the disk bus 1802, the first video bus 1803, the second video bus 1804 and the proxy bus 1806. Again, in response to control signals from the processing unit 1614, selector 1808 is arranged to select one of these input signals by application to the disk reformatting circuit 1606.

Communication paths between the router 1602 and the video buffer 1601 are bi-directional and are configured so as to transmit two real-time video sources over a twenty-seven megahertz transmission channel. To achieve this, one of the sources will be supplied to the router with the second multiplexed signal being supplied from the router back to the video buffer 1601. The router therefore includes a first multiplexor 1814 and a second multiplexor 1815 each arranged to connect multiplexed channels to respective input or output ports within the router. A third selector 1809 receives inputs from the network bus 1801, the disk bus 1802, color space converter bus 1805 and the proxy bus 1806. A selection is made by selector 1809, in response to control instructions from the processing unit 1614, resulting in a selected input signal being supplied to the multiplexor 1814. Similarly, a fourth selector 1810 receives inputs from the network bus 1801, the disk bus 1802, the color space converter bus 1805 and the proxy bus 1806. Again, in response to control signals issued by the processing unit 1814, a selected signal is supplied to multiplexor 1815.

A fifth selector receives inputs from the network bus 1801 and the disk bus 1802. Again, control signals are received from the processing unit 1614 so as to select one of these input signals which is in turn supplied to the color-space converter 1603.

Inputs from the first video bus 1803, the second video bus 1804 and the proxy bus 1806 are supplied to a sixth selector 1812. In response to control signals from the processing unit 1614, the sixth selector 1812 supplies a selected signal to the proxy generator 1604. The seventh selector 1813 receives inputs from the first video bus 1803 and the second video bus 1804. An output is selected in response to control signals from the processing unit 1614, resulting in the selected signal being supplied to the digital to analog converter 1605.

It can be appreciated that the router achieves a routing function by allowing a signal to be selected from its transmission bus. In this way, the device is effectively non-blocking because the transmission of one signal along its respective bus cannot affect the transmission of other signals along their respective buses. The router does not provide for all possible interconnections and is tailored to meet the requirements of the system's overall functionality. However, additional routing paths may be introduced by allowing signals to bypass through the proxy generator and/or the color-space converter.

Data is transmitted to interface cards 1612, 1613 and 1611 in accordance with PCI protocols. The PCI environment consists of a primary PCI bus 1615 with secondary PCI buses 1616 and 1618 connected to said primary bus by respective PCI bridges 1617 and 1619. The processing unit 1614 provides the primary bus master for the PCI environment, although other devices, such as the SSA adapter associated with the disk drives, may be allowed to bus master in preference to this processing unit. When operating power is initially supplied to processing unit 1614, configuration instructions are automatically retrieved from associated read-only memory and these instructions will determine which PCI devices are connected to the primary bus, along with an identification of their configuration requirements. This process is known in the art as scanning or probing the bus and in order to facilitate this process PCI devices implement a base set of configuration registers, in addition to device-specific configuration registers.

The configuration instructions read a sub-set of the devices configuration registers in order to determine the presence of the device and its type. Having determined the presence of the device, other configuration registers for the device are accessed to determine how many blocks of memory and the degree of input/output space is required in order to effect satisfactory operation. Memory associated with the device is then programmed, along with interface and address decoders in order to respond to memory and input/output address ranges that are guaranteed to be mutually exclusive to other devices forming part of the system. PCI configuration is implemented using address space 0800H to 08FFH thereby insuring that compatibility is retained with other environments of this type. PCI bridges 1616 and 1617 also require the implementation of two hundred and fifty six configuration registers, utilising two, thirty two bit registers located at addresses 0CF8H and 0CFCH within the address space of processing unit 1614. These registers may be identified as the configuration address register and the configuration data register.

The configuration registers are accessed by writing bus number, physical device number, function number and register number to the address register. Thereafter, an input/output read or write is performed to the data register. The configuration address register only latches data when the host processor performs a full thirty two bit write to the register. Any eight or sixteen bit access within this double word will be passed directly on to the PCI bus as an eight or sixteen bit PCI input/output access.

Figure 19:
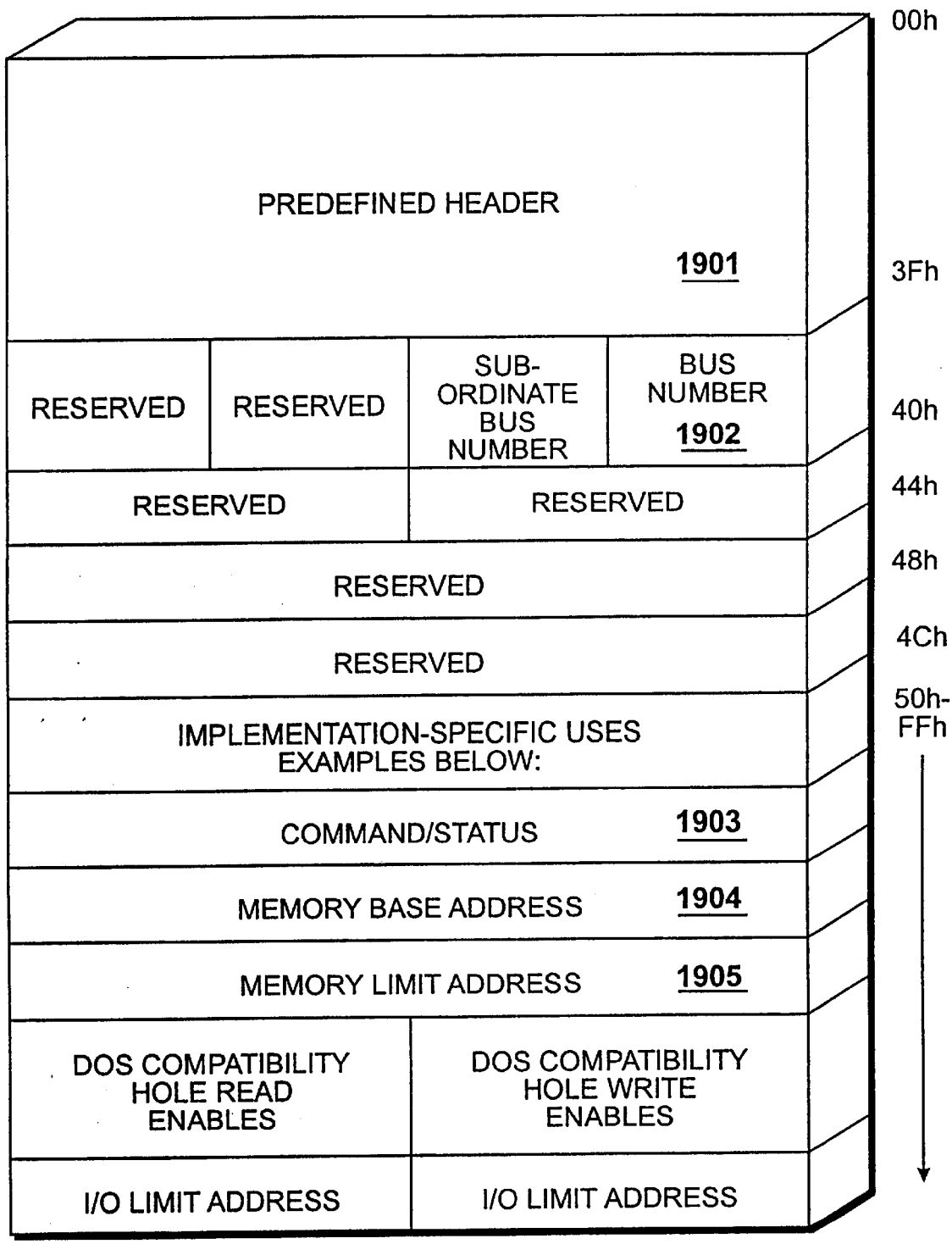
FIG. 19 illustrates the configuration of PCI devices, including the PCI ridges shown in FIG. 16.

Each bridge 1617, 1619 includes a set of configuration registers residing with it's assigned range of two hundred and fifty six configuration locations to permit tailoring of the bridge's functionality. With reference to FIG. 19, the first sixty four configuration registers are set aside for a pre-defined configuration header 1901, including a device identification, a vendor identification, a status register and a command register. Bit one of the command register is set to enable memory access, such that the PCI bridge will respond to PCI memory accesses. An eight bit register 1902 contains a number for the respective secondary PCI bus, assigned by the configuration instructions. A system re-set clears this register, whereafter reconfiguration by the configuration instructions is required in order to re-establish functionality.

Command/status register 1903 provides for selection of operational characteristics. With bit two of this byte set, the bridge is unable to respond as memory on its second bus. Memory base address 1904 and memory limit address 1905 are specified to define a range of memory addresses which, when generated on the primary bus 1615, will result in a response being made by the respective PCI bridge. Thus, this range of addresses identifies a non-addressable range which allows the control processor to command instructions to the disc array 1403. Similarly, memory accesses outside this specified range are ignored by the bridge, thereby providing the required isolation between the primary and secondary buses.

The PCI bridges are configured to allow processing unit 1614 to issue command instructions to the network card 1612, the application card 1613 and the disc card 1611 within a limited range of memory space. Consequently, the PCI bridges are not available for the transfer of image data between the secondary buses and the primary bus and a transfer of this type must take place via the router 1602.

Figure 20:
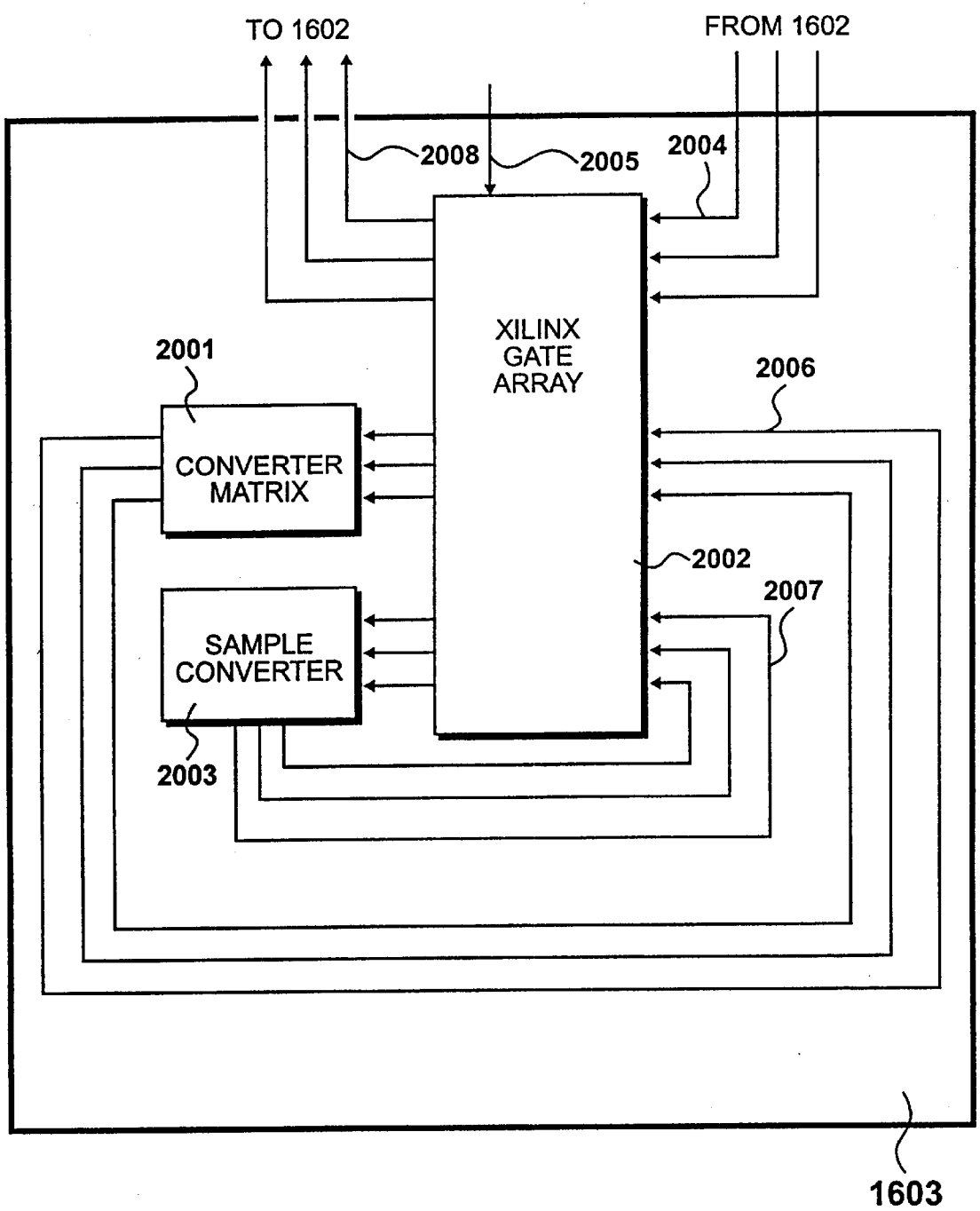
FIG. 20 details the color-space converter shown in FIG. 16.

Color-space converter 1603 is detailed in FIG. 20 and includes a conventional digital converter matrix 2001. The converter matrix 2001 receives each input sample, multiplies samples by stored coefficients and then adds appropriate components in order to effect a color-space conversion. Thus, in typical applications, conversions are effected between YUV representations of color and similar RGB representations.

The conversion process is complicated by the fact that U and V color difference signals are often conveyed at a lower sampling rate and their associated Y component, while RGB samples are produced at a rate compatible with said Y samples. Digital video signals having reduced bandwidth color components are often designated 4:2:2 to distinguish them from equally sampled components, represented as 4:4:4. The converter matrix 2001 is configured to receive and produce samples in accordance with the 4:4:4 standard, therefore it is necessary to effect up-sampling or down-sampling of the color difference signals either on the input to the converter matrix or the output of the converter matrix, depending on the direction of conversion taking place. To avoid the need to duplicated converter circuitry, the color-space converter 1603 is provided with a programmable gate array, such as the 3K device manufactured by Xilinx of San Jose, Calif., USA.

The converter 1603 includes a sample converter 2003 arranged to up-sample U and V components to produce RGB samples or to down-sample RGB components to produce Y, U and V output samples. Y samples do not require down-conversion therefore the sample converter 2003 also includes a delay device configured so as to maintain the Y samples in phase with down-sampled U and V components. An input from the router 1602 is supplied to gate array 2002 over an input bus 2004. If the input samples are in RGB format, the gate array 2002 is instructed, over a control channel 2005, to direct said samples to the converter matrix 2001. The converter matrix 2001 converts the RGB samples to YUV samples which are in turn returned to the gate array 2002 via bus 2006. Upon receiving these samples over bus 2006, the gate array directs said samples to the sample converter 2003 which reduces the rate of the U and V samples to produce samples falling within the accepted 4:2:2 protocol on an input bus 2007. The gate array receives input samples on bus 2007 and directs these to an output bus 2008 which is in turn directed to the router 1602.

Alternatively, the color-space converter 1603 may be configured to convert YUV samples to RGB samples. The gate array 2002 is instructed, via control channel 2005, to the effect that it will be receiving YUV samples. The incoming YUV samples on bus 2004 are firstly directed to the sample converter 2003 which up-samples the U and V components to produce 4:4:4 YUV samples which are returned to the gate array 2002 on input bus 2007. Within the gate array 2002, said input samples are directed to the converter matrix 2001, arranged to generate RGB representations of these samples which are in turn returned to the gate array 2002 by input bus 2006. Within gate array 2002, the samples received on bus 2006 are directed to the output bus 2008. Thus, it can be appreciated that the gate array 2002 allows samples to be directed to both the converter matrix 2001 and the sample converter 2003 in either order.

Figure 21:
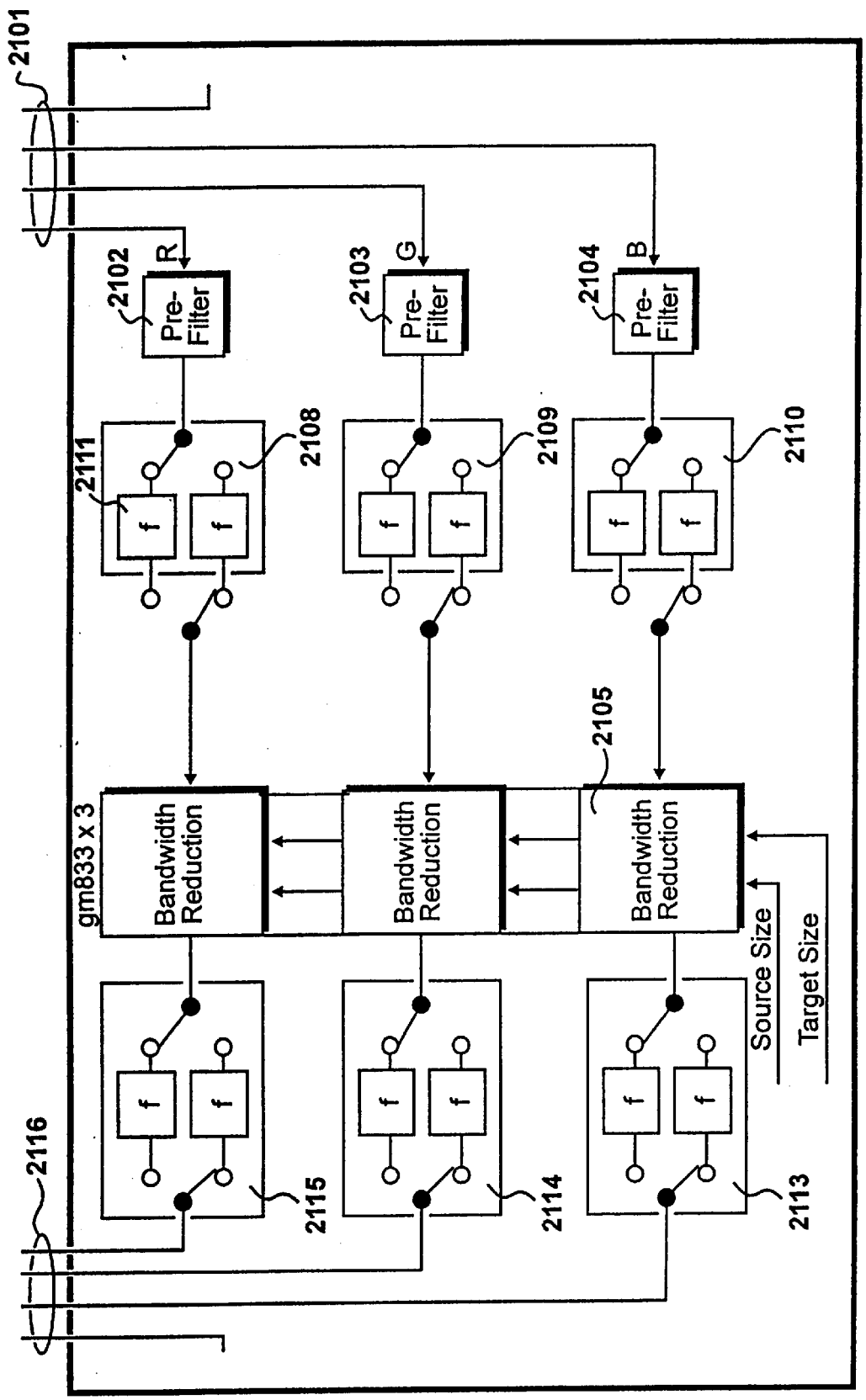
FIG. 21 details the proxy generator identified in FIG. 16.

Proxy generator 1604 is detailed in FIG. 21. Data is supplied from the router 1602 to the proxy generator 1604 over thirty-two bit bus 2101, consisting of eight bits allocated for the red component, eight bits allocated for the green component, eight bits allocated to the blue component and eight bits allocated to a control channel also known as a keying channel or an alpha channel. Bandwidth reduction of the control channel does not have meaning, therefore the eight bit red, green and blue components are supplied to respective pre-filters 2102, 2103, 2104 and the control bus is effectively terminated at 2105.

The pre-filters provide bandwidth reduction for relatively large images, such as those derived from cinematographic film. When broadcast video signals are received, no pre-filtering is necessary and bandwidth reduction is performed exclusively by a re-sizing device 2105 which, in the preferred embodiment, is a GM 833X3 acuity re-sizing engine manufactured by Genesis Microchip Inc. of Ontario Canada.

The re-sizing device 2105 receives data over lines 2106 and 2107 specifying source image size and target image size respectively. Outputs from pre-filters 2102, 2103 and 2104 are supplied to respective buffering devices 2108, 2109 and 2110. Each buffering device includes a pair of synchronized field buffers, such that a first field buffer 2111 is arranged to receive a field of data from pre-filter 2102 while a second field buffer 2112 supplies the previous field to the bandwidth reduction device 2105.

Bandwidth reduction device 2105 receives outputs from each of the buffering devices 2108, 2109, 2110 and effects bandwidth reduction upon each of the red, green and blue components in response to the programmed reduction size. In this way, the bandwidth reduction device has access to the data stored in one of the field buffers, representing the source buffer throughout a field period. Similarly, throughout this period output values for red, green and blue components are supplied to respective output buffering devices 2113, 2114 and 2115. Again, each output buffering device includes a pair of co-operating field buffers 2116 and 2117.

The outputs from the buffering devices 2113, 2114 and 2115 are reassembled into a thirty-two bit output bus 2116, with its eight bit control bytes effectively set to nil.

The re-formatters 1606 and 1607 are implemented primarily using logic cell arrays, such as the Xilinx XE3000. The devices are field programmable gate arrays configured to replace conventional TTL Logic's devices and similar devices which integrate complete subsystems into a single integrated package. In this way, a plurality of packing and unpacking configurations may be programmed within the device which are then selectable, in response to commands issued by the control processing unit 1614, for a particular packing or unpacking application.

User logic functions and interconnections are determined by configuration program data stored in internal static memory cells. This program data is itself loaded in any of several available modes, thereby accommodating various system requirements. Thus, programs required to drive the devices may permanently reside in ROM, on an application circuit board or on a disk drive. On chip initialization logic provides for automatic loading of program data at power-up. Alternatively, the circuit may be associated with an XC17XX chip available from the same source, to provide serial configuration storage in a one-time programmable package.

Within the device, block logic functions are implemented by programmed look-up tables and functional options are implemented by program controlled multiplexes. Interconnecting networks between blocks are implemented with metal segments joined by program controlled pass transistors.

Functions are established via a configuration program which is loaded into an internal distributed array of configuration memory cells. The configuration program is loaded into the device at power-up and may be re-loaded on command. The logic cell array includes logic and control signals to implement automatic or passive configuration and program data may be either bit serial or byte parallel.

The static memory cell used for the configuration memory and the logic cell array provides high reliability and noise immunity. The integrity of the device configuration is assured even under adverse condition. Static memory provides a good combination of high density, high performance, high reliability and comprehensive testability. The basic memory cell consists of two CMOS inverters plus a pass transistor used for writing and reading cell data. The cell is only written during configuration and only read during read-back. During normal operation the cell provides continuous control and the pass transistor is off and does not affect cell stability. This is quite different from the operation of conventional memory devices, in which the cells are frequently read and rewritten.

An array of configurable logic blocks provide the functional elements from which the packing and unpacking logic is constructed. The logic blocks are arranged in a matrix so that 64 blocks are arranged in 8 rows and 8 columns. Development software available from the manufacturer facilitates a compilation of configuration data which is then downloaded to the internal configuration memory to define the operation and interconnection of each block. Thus, user definition of the configurable logic blocks and their interconnecting networks may be done by automatic translation from a schematic logic diagram or optionally by installing a library of user callable macros.

Each configurable logic block has a combinational logic section, two bistables and an internal control section. There are five logic inputs, a common clock input, an asychronus reset input and an enable clock. All of these may be driven from the interconnect resources adjacent to the blocks and each configurable logic block also has two outputs which may drive interconnected networks.

Data input from either bistable within a logic block is supplied from function outputs of the combinational logic or from a block input. Both bistables in each logic block share asynchronus inputs which, when enabled and high, are dominant over clocked inputs.

The combinational logic portion of the logic block uses a 32 by 1 bit lookup table to implement Boolean functions. Variables selected from the five logic inputs and two internal clock bistables are used as table address inputs. The combinational propagation delay through the network is independent of the logic function generated and is spike free for single input variable changes. This technique can generate two independent logic functions of up to four variables.

Programmable interconnection resources in the logic cell array provide routing paths to connect inputs and outputs into logic networks. Interconnections between blocks are composed of a two layer grid of metal segments. Pass transistors, each controlled by a configuration bit, form programmable interconnection points and switching matrix's used to implement the necessary connections between selected metal segments and block pins.

The re-programable nature of the device as used within the reformatting circuit 1606 results in the actual functionality of these devices being re-configurable in response to down-loaded instructions. The devices essentially consist of many registers and as such provide an environment in which the reformatting links may be effectively "hard-wired" in preference to being assembled from the plurality of multiplexing devices.

Figure 22:
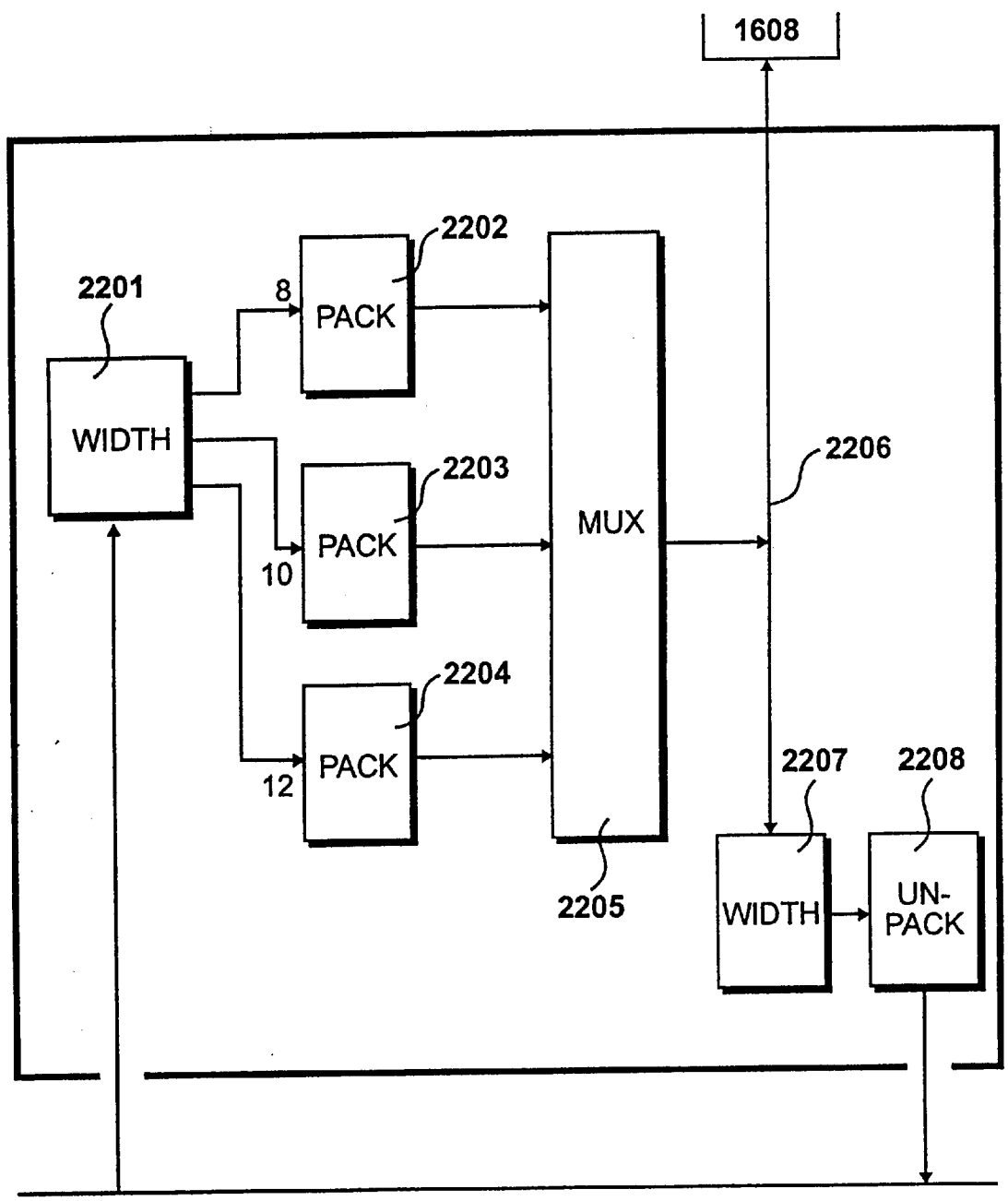
FIG. 22 details the re-formatting circuit identified in FIG. 16, including a packing circuit.

An example of the functionality within reformatting device 1606 is illustrated in FIG. 22. Input signals from router 1602 are supplied to a width selector 2201, arranged to separate RGB sub-words into eight bit representations, ten bit representations or twelve bit representations. Eight bit representations are supplied to a packing circuit 2202, ten bit sub-words are supplied to a packing circuit 2203 and twelve bit sub-words are supplied to a packing circuit 2204. Packing consists of removing redundant data from a thirty-two bit input word so as to optimise the available storage. In particular, video data usually includes a control or alpha channel whereas computer data is usually stored in RGB format without such an alpha channel.

Twelve bit representations of RGB supplied to packer 2204 may be packed as ten or eight bit representations. Ten bit words supplied to packer 2203 may be packed as eight bit representations and eight bit RGB alpha words supplied to packer 2202 may be packed as eight bit RGB, with the alpha information removed.

A particular packer output, from packer 2202, 2203 or 2204 is selected by a multiplex 2205 and supplied to bi-directional bus 2206, which in turn communicates with the disk buffer 1608.

Input signals from disk buffer 1608 are supplied to a width-modifying circuit 2207, which in turn supplies eight bit representations to unpacking circuit 2208. Circuit 2208 effectively provides a reverse process to that effected by packing circuit 2202, re-spacing the eight bit representations such that each thirty-two bit word contains a single sample with eight bits allocated for the alpha channel. This unpacked information is then supplied to the router 1602.

Figure 23:
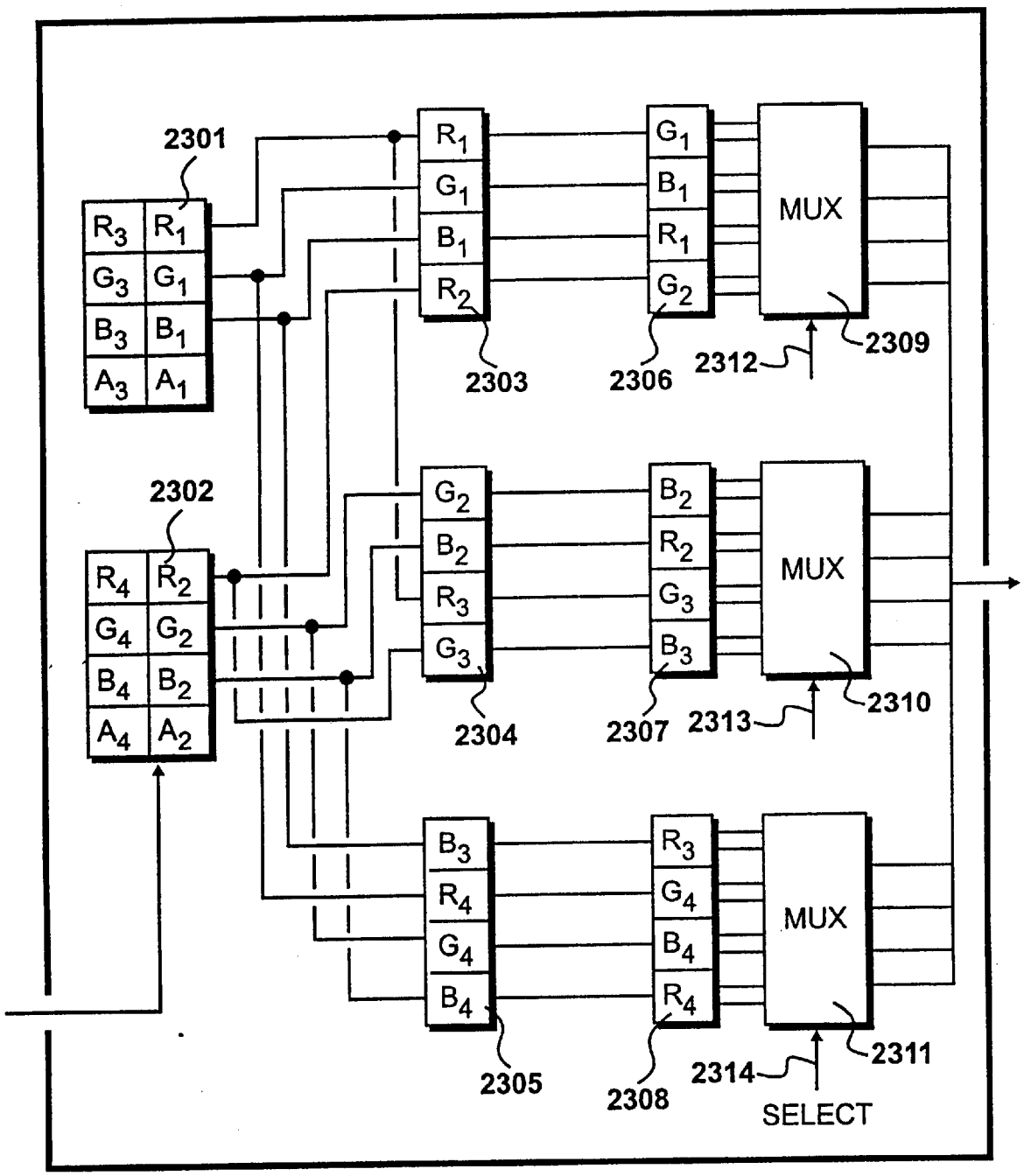
FIG. 23 details the packing circuit identified in FIG. 22.

An example of the functionality provided by packing circuit 2202 is illustrated in FIG. 23. All configurable outputs are predefined within the programmable array and are then selected by means and mulitplexing means. The array is reconfigurable and if new formats are required for a particular application, suitable reconfiguring procedures may be implemented.

The packing procedure illustrated in FIG. 23 consists of receiving thirty-two bit words consisting of eight bit sub-words for the red, green, blue and alpha components. These are packed such that only the red, green and blue information is retained, with the alpha information being disregarded.

The packing process makes use of two thirty-two bit registers 2301 and 2302. Three registers 2303, 2304 and 2305 are provided to produce output words in RGBR format, this being an arrangement which is implemented within the open GL environment of silicon graphics. A further three registers 2306, 2307 and 2308 pack the data in GBRG format, which represents a preferred arrangement for applications operating within the GL environment.

Input data words are clocked through registers 2303 and 2306, such that a first word, represented by components R1, G1, B1 and A1 is loaded to register 2301, with the second word, represented by components R2, G2, B2 and A2 being loaded to register 2302. The programable array is configured such that the first location of register 2301, representing component RI, is transferred to the first location of register 2303. Similarly, the data within the second location of 2301 is transferred to the second location of register 2303 and data within the third location of register 2301 is transferred to the third location of register 2303. Data in the fourth location of register 2301 is ignored and the fourth location of register 2303 is received from the first location of register 2302. The first location of register 2304 receives data from the second location of register 2302. Similarly, data is read from the third location of register 2302 to provide an input to the second location of register 2304. The fourth location of register 2302 is ignored, therefore all of the data retained within registers 2301 and 2302 has been processed. Consequently, new data is loaded such that register 2301 now contains components R3, G3, B3 and A3, while register 2302 contains components R4, G4, B4 and A4. Output registers 2303, 2304 and 2305 are half full and the output from the first location of register 2301 is transferred to the third location of register 2304. The output from the second location of register 2301 is transferred to the fourth location of register 2304 and the first location of register 2305 receives data from the third location of register 2301. Data from the first location of register 2302 is transferred to the second location of register 2305, data from the second location of register 2302 is transferred to the third location of register 2305 and the fourth location of register 2302 receives data from the third location of register 2302. The output registers are now full, all of the data has been read from the input registers 2301, 2302 and the transfer cycle is therefore complete.

A similar procedure is performed in order to simultaneously write data to output registers 2306, 2307 and 2308. On this occasion, the first location of register 2306 receives data from the second location of register 2301. Similarly, the second location of register 2306 receives data from the third location of register 2301 and the first location of register 2301 supplies data to the third location of register 2306. This procedure continues in a similar fashion to that described previously, so as to fill registers 2306, 2307 and 2308 with data following the GBRG format.

Outputs from register 2303 are supplied to a mulitplexer 2309, which also receives outputs from register 2306. A selection signal is supplied to the multiplexor on line 2312, resulting in the RGBR data from register 2303 or the GBRG data from register 2306 being supplied to multiplexer 2205. Similarly, outputs from register 2304 and outputs from register 2307 are supplied to a multiplexor 2310 which again supplies a particular output to multiplexor 2205 in response to a selection signal supplied on line 2313. Finally, the outputs from register 2305 and register 2308 are supplied to a third multiplexor 2311 which again receives a selection signal on a line 2314 so as to provide one of said outputs to multiplexor 2205.

Packed data from reformatting circuit 1606 is supplied sequentially to disk buffer 1608. The disk buffer 1608 includes two complete frame buffers to provide conversion between field based transmission and frame based transmission. Furthermore, when receiving data from interface card 1611, said data may be addressed randomly to one of said frame buffers while the other of said buffers is read sequentially to supply data to the reformatting circuit 1606.

Each frame within the disk buffer 1608 is striped with each disk within the disk array receiving one of said stripes. Preferably, a broadcast video frame is divided into eleven stripes and the twelfth drive of the array receives parity information from the parity circuit 1610. The SSA adapter will provide data to the effect that a disk drive within the array has failed, whereafter parity data received from the disk array is used to reconstitute the missing information by XORing the said parity information with the XORed total of the remaining stripes.

Network buffer 1609 also includes two complete frame buffers, again enabling the network side of the buffer to transfer data in complete frames while allowing field based transmission on the other side of said buffer. Full transmissions through network buffer 1609 occur sequentially and there is no need to include parity calculating circuits.

The nature of the network buffer 1609 and the disk buffer 1608 allows data to be transmitted in a randomly addressed mode of operation using conventional PCI protocols operating over buses 1616, 1615 and 1618 in combination with bridges 1617 and 1619. Similarly, the buffers also allow synchronous field by field transmission to be effected through the router 1602 and its associated circuits. In this way, the processing system 1402 provides compatible interfaces to both the addressed environment 1403 and the video environment 1404, with transfers between these environments occurring at video rate or at a rate higher than video rate.

Figure 24:
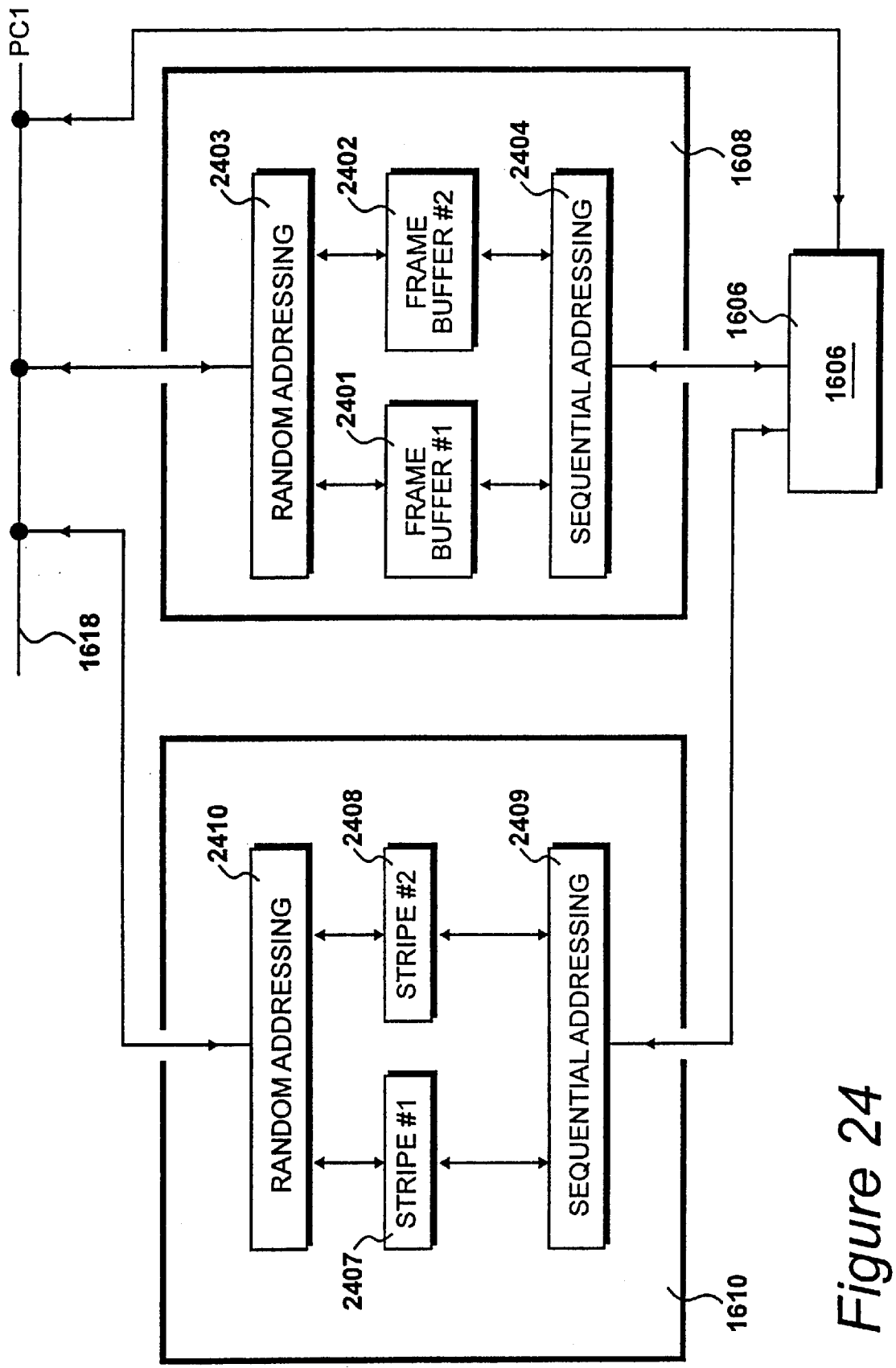
FIG. 24 details the disk buffer and parity circuit illustrated in FIG. 16, including sequential addressing circuits and random addressing circuits.

The disk buffer 1608 and the parity circuit 1610 are detailed in FIG. 24. The disk buffer includes a first frame buffer 2401 and second frame buffer 2402, each providing sufficient storage capacity for a full image frame to be stored therein. As shown in FIG. 14, each image frame is divided into a total of eleven stripes. During a data write operation, via interface card 1611, the disks in the array operate in parallel with the data originating from a respective stripe within the image frame. A random addressing circuit 2403 will read data sequentially from all of the stripes within the frame from frame buffer 2401 or from frame buffer 2402, alternately so as to provide double buffering. During a read operation, random addressing circuit 2403 will receive data from all eleven disks within the array in a substantially random order. The random addressing circuit 2403 converts the bus addresses into addresses within frame store 2401 or frame store 2402 so as to write the data in an appropriate frame store at its correct pixel location within the appropriate stripe. Within the PCI environment, addresses are used which comprise a most significant section, identifying a particular stripe, followed by a lower significant section representing the pixel position within the stripe. The random addressing circuit 2403 is arranged to convert this sectionalized address into contiguous address locations within the frame buffers 2401 and 2402. In this way, circuitry for identifying pixel position and stripe number is significantly simplified.

Transfers to reformatting circuit 1606 are effected via a sequential addressing circuit 2404. While frame buffer 2401 is communicating via random addressing circuit 2403, the second frame buffer 2402 may communicate with the sequential addressing circuit 2404. After a full frame has been transferred, these operations are reversed, such that the sequential addressing circuit 2404 may communicate with frame buffer 2401, allowing frame buffer 2402 to communicate with random addressing circuit 2403.

The sequential addressing circuit 2404 writes data to a frame buffer sequentially on a line by line basis. Similarly, the sequential line by line mode of transfer is effected during read operations from a frame buffer such that transfers to or from router 1602 are effected in a sequential line by line video-like manner. It should therefore be appreciated that the frame buffers provide the essential transformation between sequential video-type operation and random computer-like operation.

Each frame buffer 2401 and 2402 is large enough to store a full frame and each frame is divided into eleven stripes. A stripe may therefore be considered as occupying the size equivalent to one eleventh of a total frame. The parity circuit 1610 is provided with a first stripe buffer 2407 and second stripe buffer 2408, each providing capacity for the storage of one stripe, that is one eleventh of a frame.

The sequential addressing circuit 2404 writes a frame of data sequentially to frame buffer 2401 or to frame buffer 2402. A similar sequential addressing circuit 2409 similar to sequential addressing circuit 2404 and receives all of the video data in parallel with this data being supplied to sequential addressing circuit 2404. As the incoming data is written sequential to buffer 2401 or buffer 2402, the parity information is generated in parallel such that, on the next frame period, as data is being transferred from a frame buffer to the PCI environment, a complete stripe of parity data will have been generated within the respective stripe buffer 2407 or 2408.

Figure 25:
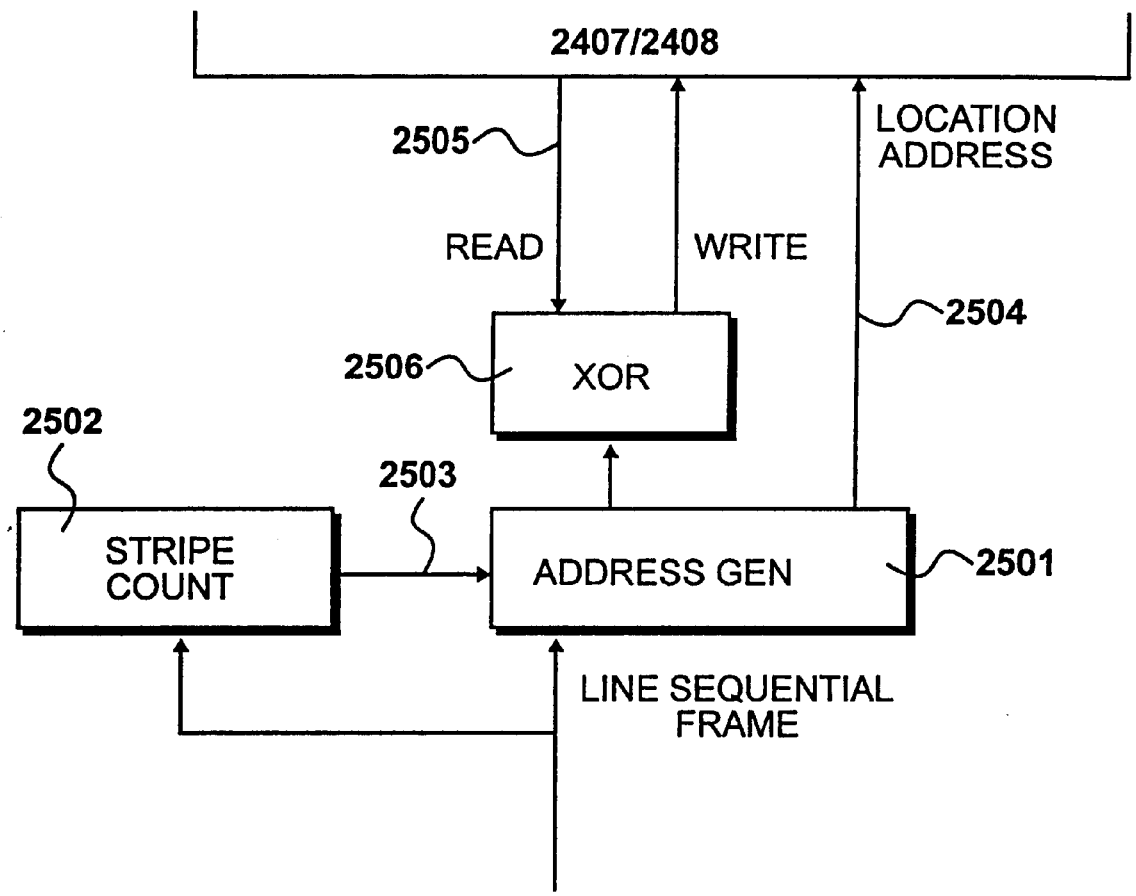
FIG. 25 details the sequential addressing circuits shown in FIG. 24.

Procedures performed by the sequential addressing circuit 2409, in order to generate parity data, are illustrated in FIG. 25. The line sequential image data is supplied to an address generating circuit 2501. The data is also supplied to a stripe counting circuit 2502. The stripe counting circuit 2502 identifies stripe boundaries within the image frame and, on detecting such a boundary, issues a stripe reset signal to the address generating circuit 2501 over a reset line 2503.

At the start of a frame, the address generating circuit includes a counter initialized at zero. As data values are received, the address generator counter is incremented to generate location addresses on line 2504. In parallel with this, the stripe counting circuit 2502 is incremented until a stripe boundary is reached. On reaching a stripe boundary, a reset signal is issued on line 2503 effectively resetting the address counter within the address generator 2501. Thus, at the start of the next stripe within the image frame, similar location addresses are generated so that the stripe buffers 2407 and 2408 are addressed eleven times, once for each stripe within the image frame.

To generate parity data, the address generator issues a location address to a stripe buffer 2407 or 2408. This results in an addressed location being read and supplied to an output read line 2505. The output on line 2505 is supplied to an exclusive OR circuit 2506, which also receives the new incoming data pixel. An exclusive ORing operation is performed upon the new incoming data with the data read from the address location, resulting in new data being written back to the same location. Thus, data presently in the stripe buffer is exclusively ORed with a new data pixel at the corresponding position, whereafter said data is then written to the stripe memory. This may be compared to the operations performed upon the frame buffers 2401. Sequential addressing circuit 2404 is merely arranged to effect single writes to unique locations within a frame buffer. While this is occurring, the sequential addressing circuit 2409 must address a location within a stripe buffer, read the address location to exclusive ORing circuit 2506 and then write the exclusively ORed data back to the stripe buffer. Thus, whereas the frame buffers undergo a single write operation, the stripe buffers undergo a read, OR and write operation. This process of reading data, performing an exclusive OR operation and then writing the data back occurs for each stripe within the image frame but insures that the generation of parity data is effected as an on-line, real-time process.

On the next cycle the data written to a frame buffer may be read by random addressing circuit 2403. Under normal operation, this will result in a data volume equivalent to eleven stripes being transferred to the PCI bus 1618 in one frame period. In addition to this, the parity buffer 1610 also includes a random addressing circuit 2410 which will read the corresponding stripe buffer, thereby transmitting a further stripe of data to the PCI bus. Consequently, the PCI environment must be capable of transferring a data volume equivalent to twelve stripes during each frame period. Data is addressed to the PCI environment with addresses having higher significance, which identify stripe, followed by lower significance which identify position within the identified stripe. In this way, it is possible for random addressing circuits 2403 and 2410 to quickly identify stripe number and location within an identified stripe. When the information is read back from the PCI environment, the random address circuit 2403 decodes the two part address to provide a contiguous address for writing the data to the appropriate frame buffer. This is illustrated in FIG. 26. An input address from the PCI environment, supplied to a random addressing circuit 2403, includes a stripe address, illustrated by line 2601, and a location within the stripe address identified as line 2602. Stripe address 2601 provides an input to a lookup table 2603 which in turn provides an output address value on line 2604 to an address summing circuit 2605. Thus, at the address summing circuit 2605, the "location within stripe" address is added to the offset address from the lookup table 2603 to provide a frame store access address to frame store 2401 or 2402.

Similar addresses are provided to the random addressing circuit 2410. The random addressing circuit 2410 is only concerned with the transfer of data to a single stripe buffer 2407 or 2408, therefore it is not necessary to generate an offset address, as required for the frame buffers. Consequently, the stripe address is supplied to an enabling circuit 2608. If a stripe address is generated identifying the parity stripe, the enabling circuit 2608 is enabled, resulting in the "location within stripe" address being supplied to the appropriate stripe buffer. For other stripes, the enabling circuit is placed in its disabled state, such that the location addresses are not supplied to a stripe buffer.

As previously stated, a normal transfer from the buffers to the PCI environment requires a bandwidth equivalent to twelve stripes during the frame period. A similar bandwidth is required during normal operations form the PCI environment to the buffers, with eleven stripes being directed to the frame buffer environment and the remaining stripe being directed to the parity buffer environment. Under normal operation, with all disks functional, the parity information is not required during a transfer to the video environment. Sequential addressing of the stripe buffers 2407/2408 on the read side is therefore disabled and sequential addressing circuit 2409 is not required to perform any operations during a normal read out of the buffers and into the video environment. Thus, under normal operation a bandwidth equivalent to eleven stripes per frame period is required on the video read side of the transfer.

If a disk failure takes place, similar to that shown in FIG. 15, ten stripes of data are supplied to random addressing circuit 2403 from the PCI environment, instead of the normal eleven, unless the parity disk has failed. Assuming a data disk has failed, an eleventh stripe is supplied to random addressing circuit 2410, therefore a total bandwidth of eleven stripes are supplied out of the PCI environment. This compares to normal operation, where a total bandwidth of twelve stripes are supplied out of the PCI environment.

Sequential addressing circuit 2404 will sequentially address the frame buffer from which data is being read. This will take place in normal sequential time but one stripe period will contain invalid data. This condition is identified to the system, which will be informed to the effect that a disk has failed. The system is now operating in an unprotected mode and further disk failure would result in total data loss. Sequential addressing circuit 2409 is enabled, resulting in the parity data being read from a stripe buffer. Within circuit 1606, the lost data is reconstituted, thereby providing an output equivalent to the full complement of eleven stripes. Thus, although one stripe is missing from the data read from the frame buffers on the sequential side, given that the data is being supplied line by line, bandwidth provision is still required in order to transfer the non-existent data. Thus, the total bandwidth requirement on the video side is equivalent to twelve stripes, in order for the parity information to be read from the sequential addressing circuit 2409.

Within circuit 1606, the lost information is regenerated as an on-line process in accordance with the procedures detailed in FIG. 15. In this way, full frames of data are transferred to router 1602, such that the video environment is unaware of a disk failure occurring on the PCI side.

In conventional systems, operators would be alerted to the fact that the system is transferring data in a unprotected mode, such that further disk failure would result in total data loss. Under these circumstances, an operator would be encouraged to cease working such that the failed disk could be replaced whereafter the whole disk would undergo data regeneration, by XORing parity information, so as to reconstitute the lost data onto the new disk. This process is generally known in the art as healing". Thus, although the healing procedure is necessary in order to ensure that a system may return to operation in protected mode, placing the system off-line in order for the heal to take place effectively results in the machine being unavailable for creative work.

The present system overcomes this problem by allowing a new disk to be healed while the system remains operational. Alternatively, the system may be placed off-line, in order to effect a total healing procedure but the time taken for such a healing procedure to take place is significantly reduced given that healing will be effected in real-time, without requiring workstations, such as station 1307 to be involved in the parity calculations.

The healing of disks in a disk array while the system remains operational may be referred to as "healing on the fly". This is made possible within the present system due to the double buffering of data within the disk and parity buffers 1608, 1610. For the purposes of illustration, it will be assumed that data is being written from the PCI environment to frame buffer and stripe buffer number one, while data is being read to the video environment from frame buffer and stripe buffer number two. The PCI disk has failed therefor ten stripes of data are being written to frame buffer 2401, with the associated parity data being written to stripe buffer 2407. While these transfers are taking place, frame buffer 2402 is addressed sequentially, with stripe buffer 2408, so as to reconstitute the lost data. In addition to being supplied to the video environment, the lost data is also returned to the PCI environment, over bus 2415. As previously stated, the PCI bus 1618 provides sufficient bandwidth for twelve stripes to be transferred from PCI to buffers 1608 and 1610. In order for lost data to be written back to the PCI environment, it is not necessary to provide any additional bandwidth on the PCI bus. Given that a disk has failed, only eleven stripes-worth of data are being supplied in the forward direction. This means that a single stripes-worth of bandwidth remains unused. Thus, this bandwidth is employed for performing a write operation in the other direction, thereby allowing the regenerated data to be used in an on-line way to heal a new disk placed within the array.

Figure 27:
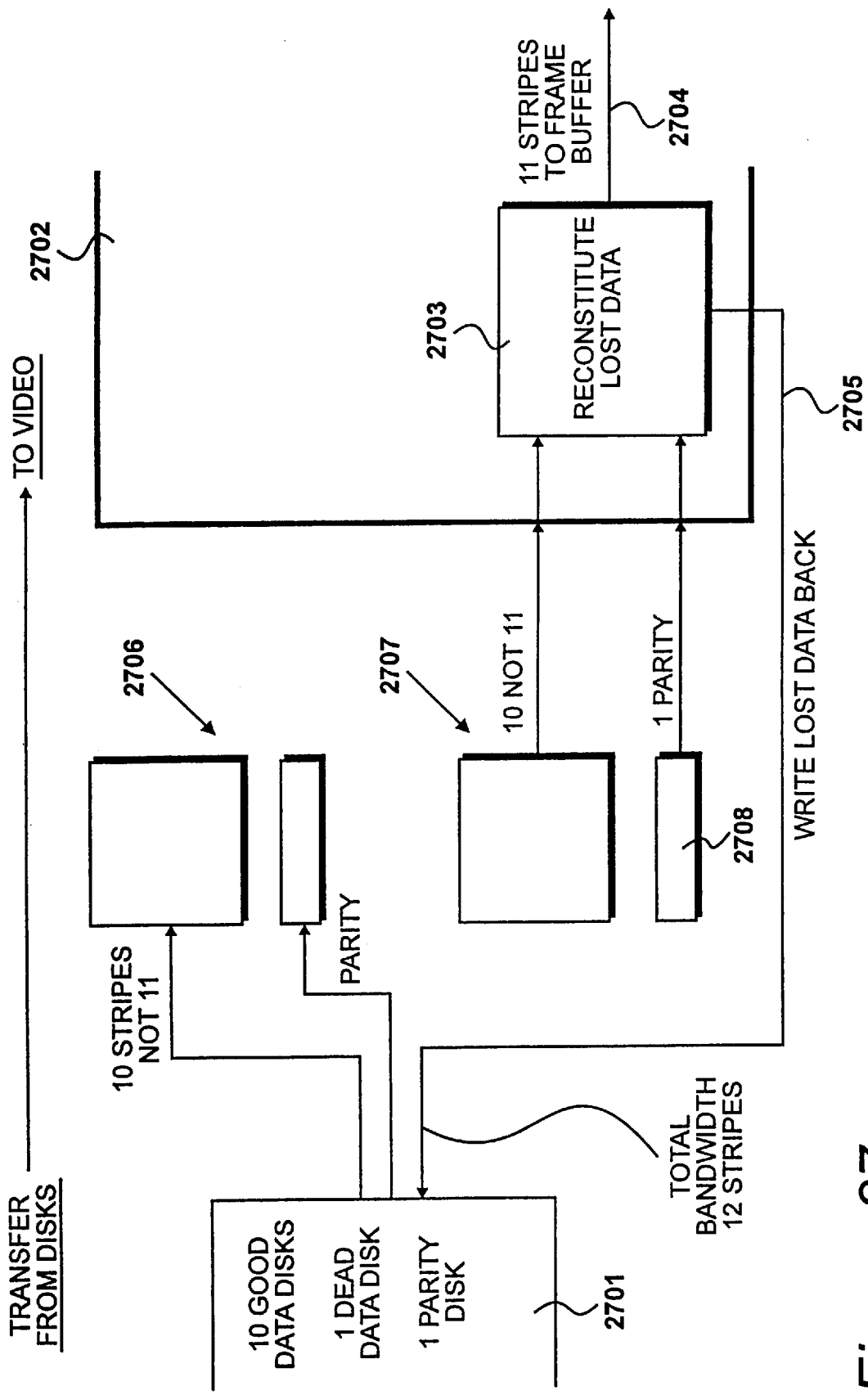
FIG. 27 illustrates on-line real time disk healing procedures.

This procedure is further illustrated in FIG. 27. PCI environment 2701 provides a total bandwidth of twelve stripes for transferring data to frame buffer 2401, stripe buffer 2407, frame buffer 2402 and stripe buffer 2408. These are configured in a "Ping-Pong" arrangement such that the first pair of buffers (2706 and 2707 in FIG. 27) are written to, while the other pair (2402 and 2408) are read from. On the next cycle, the roles of these buffers are reversed so as to provide the double buffering facility. Thus, during the writing of data to buffers 2706 and 2707, data is read from buffers 2402 and 2408 to provide data sequentially to the video environment 2701.

When disk failure occurs (assumed to be a data disk) ten good data disks are read so as to provide ten stripes of data and not eleven stripes of data to frame buffer 2401. The parity data remains good resulting in parity data being written to stripe buffer 2407. On the read side, ten stripes of data will be read from buffer 2402 and not eleven stripes of data. The parity data is read from buffer 2708, allowing the lost data to be reconstituted within regeneration system 2703, substantially in accordance with the procedures detailed in FIG. 15. This now allows eleven stripes of data, i.e. a full frame of data, to be supplied to subsequent video processing systems, as illustrated by line 2704. In addition, the lost data is written back to the PCI environment 2701 over line 2705. Under normal operation, data will be read from the PCI environment consisting of eleven data stripes plus one parity stripe, within a frame period. During disk failure, only ten stripes of data are read such that only a total of eleven stripes are being read during the frame period. This means that additional bandwidth is available which is used to write the lost data back to the PCI environment so as to allow a disk healing process to take place. Thus, with disk healing, the total bandwidth of twelve stripes per frame period is employed in order to allow on-line operation to be maintained while healing continues. Thus, after reading unprotected data once, a new disk will have been healed with the lost data, such that the data will automatically be reconstituted back into its protected status.

What we claim is:

1. Video storage apparatus comprising storage means, transfer means and processing means, wherein
said storage means comprises a plurality of storage devices configured to store respective stripes of image frames with redundant data derived from said stripes,
said transfer means is arranged to transfer image data at image display rate at or at a rate greater than said display rate,
said processing means is configured to regenerate lost data from said redundant data during a reading operation to provide output data to a compositing process and to write said regenerated data to an operational storage device while said output data is being supplied to said compositing process while maintaining said rate; and
wherein said processing means writes the regenerated data to the operational storage device using bandwidth normally allocated during on-line operation for reading data from a storage device that contained the lost data and that has become non-operational.

2. Apparatus according to claim 1, wherein said storage devices are magnetic disks.

3. Apparatus according to claim 2, wherein each stripe is written to a respective disk and said redundant data is written separate disk.

4. Apparatus according to claim 3, wherein said redundant data is parity data derived by an exclusive ORing operation.

5. Apparatus according to claim 1, wherein output data is written to a frame buffer.

6. Apparatus according to claim 5, wherein two output frame buffers alternate in operation, to effect double buffering in which a first buffer is written to randomly from the storage devices and a second buffer is read sequentially as a synchronized video stream.

7. Apparatus according to claim 6, wherein said video stream is compatible with D1 video recommendation.

8. Apparatus according to claim 1, wherein said processing means detects data errors and initiates data regeneration in response to said detection.

9. Apparatus according to claim 1, wherein a spare drive is maintained in an array to receive regenerated data.

10. Apparatus according to claim 1, wherein said processing means is configured to label image frames as being protected or as being unprotected.

11. Apparatus according to claim 1, wherein said processing means is configured to perform additional regeneration of data not requested for output during relatively idle periods.

12. Apparatus according to claim 1, wherein said processing means is configured to detect disk imbalance conditions after data has been regenerated.

13. A method of storing video data, wherein image stripes derived from image frames in combination with redundant data derived from said stripes are stored on a plurality of storage devices, image data is transferred at substantially image display rate or at a rate greater than said display rate, lost data is regenerated from said redundant data during a reading operation, and said regenerated data is written to an operational storage device while output data is being supplied at said transfer rate while maintaining said rate, wherein the regenerated data is written to the operational storage device using bandwidth normally allocated during on-line operation for reading data from a storage device that contained the lost data and that has become non-operational.

14. A method according to claim 13, wherein errors are detected during the replay of video data and data regeneration is initiated in response to said detection.

15. A method according to claim 13, wherein output image frames are labelled as being protected or as being unprotected, wherein an unprotected label indicates that data has been regenerated.

16. A method according to claim 13, wherein additional regeneration of data is effected during idle periods.

17. A method according to claim 13, including procedures for detecting disk imbalance conditions after data has been regenerated.

18. A method according to claim 13, wherein said video data is derived from cinematographic film.

19. A method according to claim 13, wherein said video data is derived from high definition video frames.

20. A method according to claim 13, wherein said video data is derived from broadcast video fields.

21. A video data storage system comprising:

storage devices for storing respective portions of a video data signal and redundancy data derived from the respective portions of the video data signal; and a processing system configured to maintain normal on-line operation of said data storage system wherein a transfer rate of the video data signal is maintained at a normal transfer rate when one of said storage devices storing a portion of the video data signal becomes non-operational by regenerating video data stored on the non-operational storage device using the redundancy data, said processing system being further configured to write the regenerated video data to an operational storage device while the normal transfer rate during on-line operation of said data storage system is maintained, wherein the portion of the video data signal stored on the non-operational storage device is at least partly healed while the normal on-line operation of said data storage system is maintained, and wherein the processing system writes the regenerated video data to the operational storage device using bandwidth normally allocated during on-line operation for reading video data from the storage device that has become non-operational.

22. A system according to claim 21, wherein the video data signal is a D1 video signal.

23. A system according to claim 21, wherein frames of the video data signal are divided into stripes and each stripe is stored on a respective corresponding one of said storage devices.

24. A system according to claim 23, wherein the redundancy data is parity data derived by logically combining the data supplied to said storage devices.

25. A system according to claim 24, wherein said processing system regenerates data by logically combining parity data and data from the operational storage devices.

26. A system according to claim 21, further comprising:
   first and second frame buffers each of which is alternately operable for being written with data output from said storage devices and for being read to input data to said storage devices.

27. A method of operating a data storage system comprising storage devices, the method comprising:

storing on said storage devices respective portions of a video data signal and redundancy data derived from the respective portions of the video data signal;

maintaining a normal transfer rate of the video data signal during on-line operation of said data storage system when one of said storage devices storing a portion of the video data signal becomes non-operational by regenerating video data stored on the non-operational storage device using the redundancy data; and writing the regenerated video data to an operational storage device while the normal transfer rate during on-line operation of said data storage system is maintained, whereby the portion of the video data signal stored on the non-operational storage device is at least partly healed while the on-line operation of said data storage system is maintained, and wherein the regenerated video data is written to the operational storage device using bandwidth normally allocated during on-line operation for reading data from a storage device that has become non-operational.

28. A method according to claim 27, wherein the video data signal is a D1 video signal.

29. A method according to claim 27, wherein frames of the video data signal are divided into stripes and each stripe is stored on a respective corresponding one of said storage devices.

30. A method according to claim 29, wherein the redundancy data is parity data derived by logically combining the data supplied to said storage devices.

31. A method according to claim 30, wherein the data is regenerated by logically combining parity data and data from the operational storage devices.

* * * * *

UNITED STATES PATENT AND TRADEMARK OFFICE
CERTIFICATE OF CORRECTION

PATENT NO.     : 6,404,975 B1                                                    Page 1 of 1
DATED          : June 11, 2002
INVENTOR(S)    : Raju C. Bopardikar and Adrian R. Braine It is certified that error appears in the above-identified patent and that said Letters Patent is hereby corrected as shown below:

<u>Title page,</u>
Item [56], References Cited, U.S. PATENT DOCUMENTS, after "5,720,037 A 2/1998", "Bilris" should read -- Biliris --

Signed and Sealed this

Eighth Day of April, 2003

JAMES E. ROGAN
*Director of the United States Patent and Trademark Office*